(12) United States Patent
Park et al.

(10) Patent No.: US 8,558,975 B2
(45) Date of Patent: Oct. 15, 2013

(54) LIQUID CRYSTAL DISPLAY DEVICE AND METHOD OF FABRICATING THE SAME

(75) Inventors: Se-Young Park, Gyeonggi-do (KR); Jeong-Hyeon Kim, Seoul (KR); Sung-Chol Yi, Gyeonggi-do (KR); Chang-Gu Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 242 days.

(21) Appl. No.: 12/907,446

(22) Filed: Oct. 19, 2010

(65) Prior Publication Data

US 2011/0102715 A1    May 5, 2011

(30) Foreign Application Priority Data

Oct. 29, 2009 (KR) .................. 10-2009-0103748

(51) Int. Cl.
*G02F 1/1335* (2006.01)

(52) U.S. Cl.
USPC .......... 349/106; 345/107; 359/241; 359/245; 359/250; 359/251; 359/252; 438/27; 257/E21.499

(58) Field of Classification Search
USPC ......................... 349/106; 345/107
See application file for complete search history.

(56) References Cited

U.S. PATENT DOCUMENTS

| | | | |
|---|---|---|---|
| 5,451,980 A | 9/1995 | Simon et al. | |
| 5,570,139 A | 10/1996 | Wang | |
| 5,973,316 A | 10/1999 | Ebbesen et al. | |
| 5,986,808 A | 11/1999 | Wang | |
| 5,991,000 A | 11/1999 | Shimabukuro et al. | |
| 6,040,936 A * | 3/2000 | Kim et al. | 359/245 |
| 6,097,456 A | 8/2000 | Wang | |
| 6,122,091 A | 9/2000 | Russell et al. | |
| 6,236,033 B1 | 5/2001 | Ebbesen et al. | |
| 6,285,020 B1 | 9/2001 | Kim et al. | |
| 6,441,298 B1 * | 8/2002 | Thio | 136/250 |
| 6,992,826 B2 | 1/2006 | Wang | |
| 7,085,220 B2 | 8/2006 | Fujikata et al. | |
| 7,110,154 B2 * | 9/2006 | Ballato et al. | 359/245 |
| 7,206,114 B2 | 4/2007 | Ballato et al. | |

(Continued)

FOREIGN PATENT DOCUMENTS

| | | | |
|---|---|---|---|
| JP | 2008-070061 | * | 11/2008 |
| JP | 2008-270061 | | 11/2008 |

(Continued)

OTHER PUBLICATIONS

Lee, Hong-Shik, et al., *Color filter based on a subwavelength patterned metal grating*, Nov. 12, 2007, pp. 1-7.

(Continued)

*Primary Examiner* — Edward Glick
*Assistant Examiner* — Sang V Nguyen
(74) *Attorney, Agent, or Firm* — Morgan, Lewis & Bockius LLP

(57) ABSTRACT

A method of fabricating a liquid crystal display device includes preparing a first substrate and a second substrate, forming a thin film transistor including a gate electrode, semiconductor layer, source electrode, and a drain electrode on the first substrate, forming a pixel electrode connected to the drain electrode on the first substrate, forming a color filter having a transmissive pattern with a plurality of periodic holes, forming a sealant between the first substrate and the second substrate, and bonding the first and second substrates to each other.

22 Claims, 21 Drawing Sheets

(56) References Cited

U.S. PATENT DOCUMENTS

| | | | |
|---|---|---|---|
| 7,248,297 B2 | 7/2007 | Catrysse et al. | |
| 7,417,219 B2 | 8/2008 | Catrysse et al. | |
| 7,420,156 B2 | 9/2008 | Kim et al. | |
| 2006/0284829 A1* | 12/2006 | Moriyama et al. | 345/107 |
| 2007/0052890 A1* | 3/2007 | Sakai | 349/114 |
| 2007/0188679 A1* | 8/2007 | Liao | 349/106 |
| 2007/0216832 A1* | 9/2007 | Takahashi et al. | 349/106 |
| 2008/0030657 A1* | 2/2008 | Wu et al. | 349/106 |
| 2009/0027329 A1* | 1/2009 | Choi et al. | 345/107 |
| 2009/0034055 A1 | 2/2009 | Gibson | |
| 2009/0087793 A1 | 4/2009 | Kim et al. | |
| 2009/0091644 A1* | 4/2009 | Mackey | 348/273 |
| 2009/0268130 A1* | 10/2009 | Yeh et al. | 349/73 |
| 2010/0046077 A1* | 2/2010 | Lee et al. | 359/585 |
| 2010/0220377 A1* | 9/2010 | Yamada et al. | 359/241 |

FOREIGN PATENT DOCUMENTS

| | | |
|---|---|---|
| JP | 2008-270061 A | 11/2008 |
| WO | 2008/082569 A1 | 7/2008 |
| WO | 2009/011439 A1 | 1/2009 |

OTHER PUBLICATIONS

Inoue, Daisuke, et al., RGB Color Filter Comprising Aluminum Film with Surface Plasmon Enhanced Transmission through Sub-Wavelength Hole-Arrays, pp. 150-151.

Chinese Office Action (Application No. 201010528306.6) dated Mar. 1, 2012, with English translation.

KIPO: Office Action for Korean Patent Application No. KR 10-2009-0103748—Issued on Jun. 28, 2013.

* cited by examiner

λmax   Red            Green           Blue

LIQUID CRYSTAL DISPLAY DEVICE AND METHOD OF FABRICATING THE SAME This application claims the benefit of the Korean Application No. 10-2009-0103748, filed on Oct. 29, 2009, which is hereby incorporated by reference.

BACKGROUND OF THE INVENTION

1. Field of the Invention

The present invention relates to a liquid crystal display device and a method of fabricating the same, and more particularly to a liquid crystal display device having a color filter with a three-dimensional (3D) pattern structure provided with a transmissive pattern for selectively transmitting light of a specific wavelength, and a method of fabricating the same.

2. Discussion of the Related Art

Recently, as information displaying becomes more attractive and demands on the use of portable information media increase, research and commercialization of light and thin flat panel displays (FPDs), which substitute cathode ray tubes (CRTs) as the existing display devices, have increased. Among the FPDs, liquid crystal display (LCD) devices display images using optical anisotropic property of liquid crystal. The LCD devices exhibit excellent resolution, color rendering property, image quality and the like, so they are widely applied to laptop computers, desktop monitors, and the like.

The LCD device includes a color filter substrate, an array substrate, and a liquid crystal layer interposed between the color filter substrate and the array substrate. The fabrication of the LCD device requires performing a masking process (i.e., a photolithography process) multiple times. Accordingly, reducing the number of masks can enhance productivity.

Hereinafter, a structure of a related art LCD device will be described in detail with reference to FIG. 1. FIG. 1 is a perspective view showing a structure of the related art LCD device. As shown in FIG. 1, the LCD device includes a color filter substrate 5, an array substrate 10, and a liquid crystal layer 30 interposed between the color filter substrate 5 and the array substrate 10.

The color filter substrate 5 is provided with a color filter C having a plurality of sub color filters 7 for rendering red (R), green (G), and blue (B) colors, a black matrix 6 dividing adjacent sub color filters 7 and blocking light transmission through the liquid crystal layer 30, and a transparent common electrode 8 for applying a common voltage to the liquid crystal layer 30.

The array substrate 10 is provided with a plurality of gate lines 16 and data lines 17 arranged horizontally and longitudinally to define a plurality of pixel regions P, thin film transistors (TFTs) T as switching devices formed at intersections between the gate lines 16 and the data lines 17, and pixel electrodes 18 formed on the respective pixel regions P.

The color filter substrate 5 and the array substrate 10 facing each other are bonded to each other by a sealant (not shown) formed at an edge of an image display region, thereby constructing a liquid crystal panel. The attachment between the color filter substrate 5 and the array substrate 10 may be implemented by an alignment key (not shown) formed either at the color filter substrate 5 or at the array substrate 10.

In order to prevent light leakage due to an alignment error upon attachment, a line width of the black matrix is set to be wide to ensure an alignment margin. However, an increase in the line width of the black matrix results in a decrease of the aperture ratio of the liquid crystal panel.

The related art color filter used in LCD devices is configured to filter portions of the incident light by absorbing light with frequency components corresponding to unnecessary colors using dyes or pigments. In particular, the color filter transmits light with only one of the three primary colors (i.e., RGB) among the white light incident upon one sub-pixel. Accordingly, it is difficult to expect transmittance of more than 30% for the color filter. Therefore, the transmission efficiency of a panel is lowered, which causes power consumption due to the need for increasing the backlight power.

FIG. 2 is an exemplary view showing transmission efficiency of a panel upon the use of a related art color filter using a pigment dispersing method. As shown in FIG. 2, light emitted from the backlight is reduced to less than 5% of its original amount while transmitting sequentially through a polarizer, TFT array, liquid crystal, and color filter. In this example, the polarizer, TFT array, and color filter have transmittance of about 40%, 45-55%, and 25%, respectively.

In fabricating the related art color filter, color resist coating, exposure to light, development and hardening processes are repeated for each primary color. Accordingly, the whole fabrication process is complicated. Further, in addition to a TFT process line, a color filter process line should be run to fabricate the color filter on a color filter substrate, thereby increasing a line installation cost.

SUMMARY OF THE INVENTION

Accordingly, the present invention is directed to a liquid crystal display device and method of fabricating the same that substantially obviates one or more problems due to limitations and disadvantages of the related art.

An object of the present invention is to provide an LCD device capable of enhancing the aperture ratio and transmittance of a panel by forming a color filter with improved transmission efficiency using surface plasmon phenomenon rather than using the existing dyes or pigments, and a method of fabricating the same.

Another object of the present invention is to provide an LCD device capable of simplifying a fabrication process and decreasing cost by using the color filter as a common electrode or a rear surface ITO or forming the color filter on a lower array substrate, and a method of fabricating the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method of fabricating a liquid crystal display device includes preparing a first substrate and a second substrate, forming a thin film transistor including a gate electrode, semiconductor layer, source electrode, and a drain electrode on the first substrate, forming a pixel electrode connected to the drain electrode on the first substrate, forming a color filter having a transmissive pattern with a plurality of periodic holes, forming a sealant between the first substrate and the second substrate, and bonding the first and second substrates to each other.

In another aspect, the liquid crystal display device includes a first substrate, a thin film transistor including a gate electrode, semiconductor layer, source electrode, and a drain electrode formed on the first substrate, a pixel electrode connected to the drain electrode formed on the first substrate, a color filter having a transmissive pattern with a plurality of periodic holes, a second substrate bonded to the first substrate, and a sealant formed between the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The improvement of transmittance by way of improving an aperture ratio of an array substrate in the related art is faced with physical limitations. Accordingly, the general paradigm needs to be shifted to a new paradigm for enhancing a transmittance ratio.

A method of filtering light by forming a transmissive pattern through a metal or dielectric layer so as to selectively transmit light with specific wavelengths has been introduced. The present invention is to provide a color filter capable of selectively transmitting red, green, and blue light by forming a metal layer using a surface plasmon or resonance phenomenon.

Figure 1:
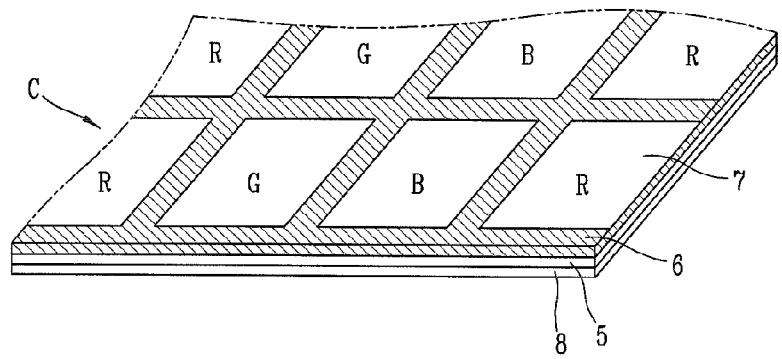
FIG. 1 is a perspective view showing a related art LCD device.
Figure 1:
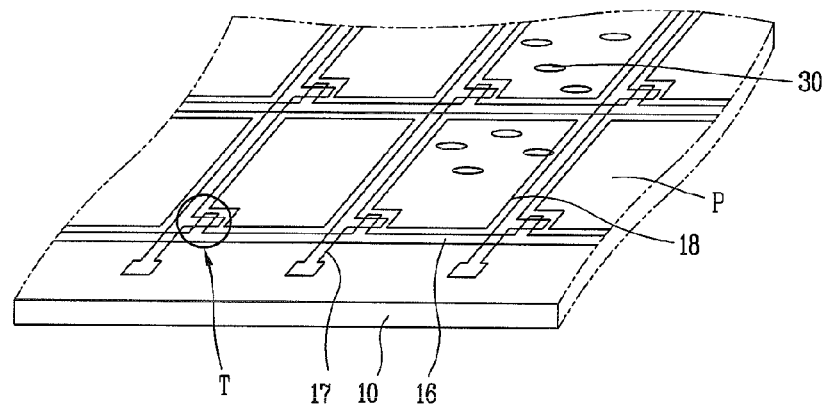
Figure 2:
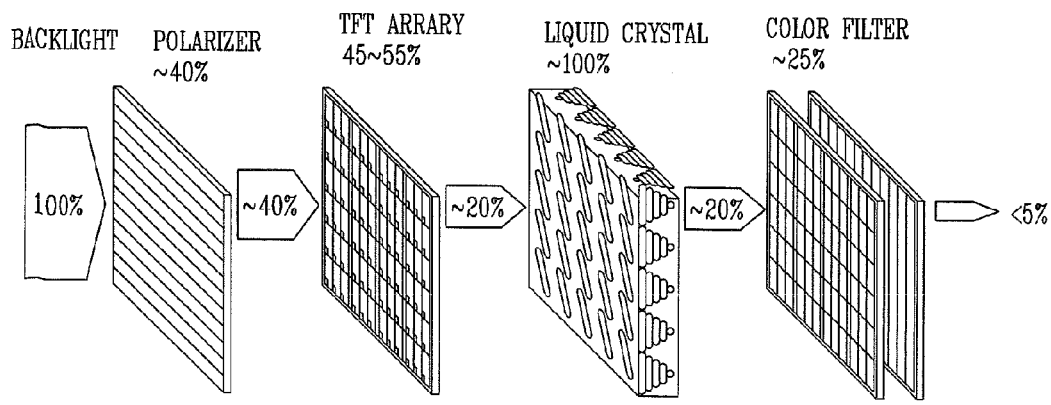
FIG. 2 is an exemplary view showing a transmission efficiency of a panel using a color filter using a general pigment dispersing method according to the related art.
Figure 3A:
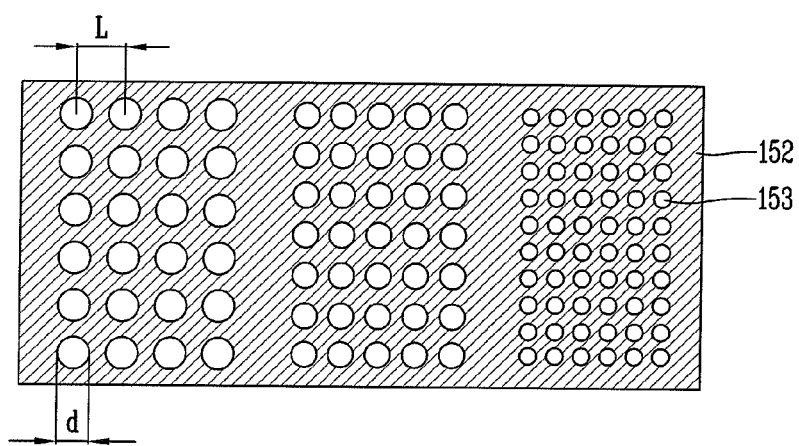
FIGS. 3A and 3B are planar and sectional views respectively showing a structure of a color filter fabricated using a surface plasmon phenomenon in accordance with a first exemplary embodiment of the present invention.
Figure 3B:
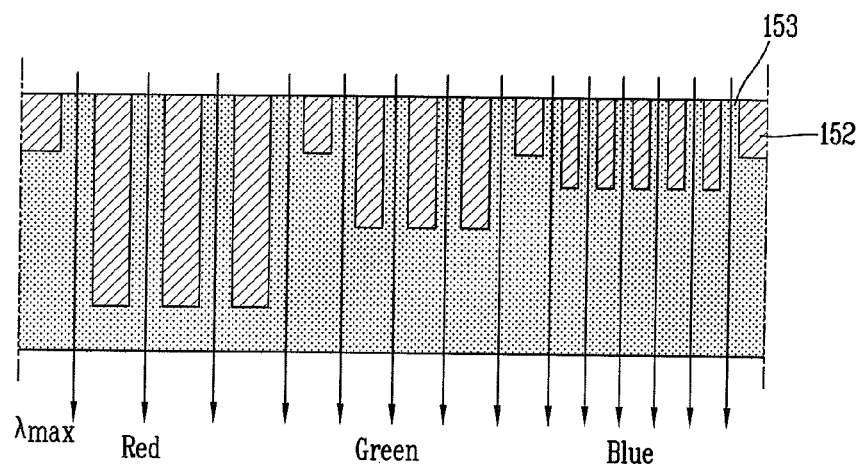

FIGS. 3A and 3B are planar and sectional views respectively showing a structure of a color filter fabricated using a surface plasmon phenomenon in accordance with an exemplary embodiment of the present invention.

As shown in FIGS. 3A and 3B, if sub-wavelength transmissive patterns 153 having a predetermined period L are formed through a layer 152, an electric field of incident light (ray) having wavelengths from visible rays to near-infrared rays is coupled to a plasmon. The layer 152 may be a metal layer or a dielectric layer. For simplification, the layer 152 will be referred to as a metal layer. However, similar structures can be made using a dielectric material as the layer 152.

As shown in FIG. 3B, the metal layer 152 may be formed on a dielectric layer. In this case, portions of the dielectric layer that are not filled with the metal layer 152 will form the sub-wavelength transmissive patterns 153. Alternatively, although not shown, dielectric sub-wavelength transmissive patterns 153 may be formed by filling dielectric material in a metal layer. In this case, portions of the metal layer that are not filled with the dielectric sub-wavelength transmissive patterns 153 will be metal layers 152. With these configurations, rays with specific wavelengths are transmitted and the rest are all reflected, thereby realizing RGB colors.

For example, if a plurality of sub-wavelength hole with a predetermined period L are formed through a silver film, only selected red, green, and blue rays with specific wavelengths are transmitted according to the size d and the period L of each hole so as to render RGB colors. Also, the transmission of rays attracts rays adjacent to the hole, resulting in transmission of more rays as compared to the area of the hole.

In addition, for realizing a color with high purity, the thickness of the sub-wavelength transmissive patterns 153 corresponding to each wavelength may be independently adjusted. In particular, the thickness of sub-wavelength transmissive patterns 153 for each wavelength can be varied. For example, as shown in FIG. 3B, the thickness of the metal layers 152 corresponding to each sub-wavelength transmissive patterns 153 for each wavelength can increase and subsequently decrease. Alternatively, thickness of the sub-wavelength transmissive patterns 153 for each wavelength can increase and subsequently decrease. However, the present invention may not be limited to this. In particular, the thickness of the sub-wavelength transmissive patterns 153 for each wavelength can be set to be uniform. Further, the thickness of the sub-wavelength transmissive patterns 153 can be set to be identical to the thickness of the metal layer 152.

Plasmon refers to a quasiparticle that free electrons induces on a surface of metal oscillate collectively by an electric field of incident light. A surface plasmon indicates that the plasmon partially exists on the metal surface, which corresponds to an electromagnetic wave that proceeds along an interface between the metal and a dielectric.

The surface plasmon phenomenon refers to forming light of a specific wavelength as light of a specific wavelength incident onto a surface of metal having a nano-sized periodic hole pattern resonates with free electrons on the metal surface. Only light of specific wavelengths is made to transmit through the hole. Accordingly, light of other wavelengths is made reflected from the metal surface.

Such a characteristic can be used to adjust a period of a transmissive pattern so as to allow transmission of desired light, thereby dividing white light into various colors. Here, the transmitted light has a wavelength corresponding to about 1.7~2 times that of a transmissive pattern period. Hence, it is possible to transmit light with desired wavelengths by adjusting the periods of the transmissive pattern.

Here, a horizontal sectional surface of the hole of the transmissive pattern may be varied into various shapes, such as oval, triangle, square, rectangle and the like, if necessary, without being limited to the simply circular shape such as a hole. For a hole, it may have a size, namely, a diameter in the range of 100 to 300 nm and a period in the range of 300 to 700 nm. The period and the size of a hole may be set to about 300 nm and 155 nm, respectively, for transmission of blue light with 436 nm wavelength. The period and the size of the hole may be set to about 450 nm and 180 nm, respectively, for transmission of green light with 538 nm wavelength. Also, the period and the size of the hole may be set to about 550 nm and 225 nm, respectively, for transmission of red light with 627 nm wavelength.

As such, hole patterns with the predetermined periods and sizes are formed at a metal layer, thereby being used as a color filter using a surface plasmon phenomenon occurring on the metal layer. Also, such hole pattern structure may be applied to an LCD device to realize colors.

Here, the related art color filter has been formed on an upper color filter substrate. However, the color filter using the surface plasmons proposed in the present invention may be formed on, but not limited thereto, a lower array substrate or outside a substrate.

The related art color filter using dyes or pigments cannot be formed by a high temperature process. However, the color filter using metal layers allows thin film transistors (TFTs) to be fabricated at the metal layer through the high temperature process. Further, the formation of the color filter at the lower array substrate results in overcoming the problem of the related art LCD device, e.g., having no option but to decrease the aperture ratio to ensure an alignment margin for bonding the upper color filter substrate and the lower array substrate.

When TFTs and color filters are all formed on the array substrate, it may be expected to extend to a technology of simplifying a process or even removing the upper color filter substrate of an LCD device. Accordingly, the ripple effect can be great.

Figure 4:
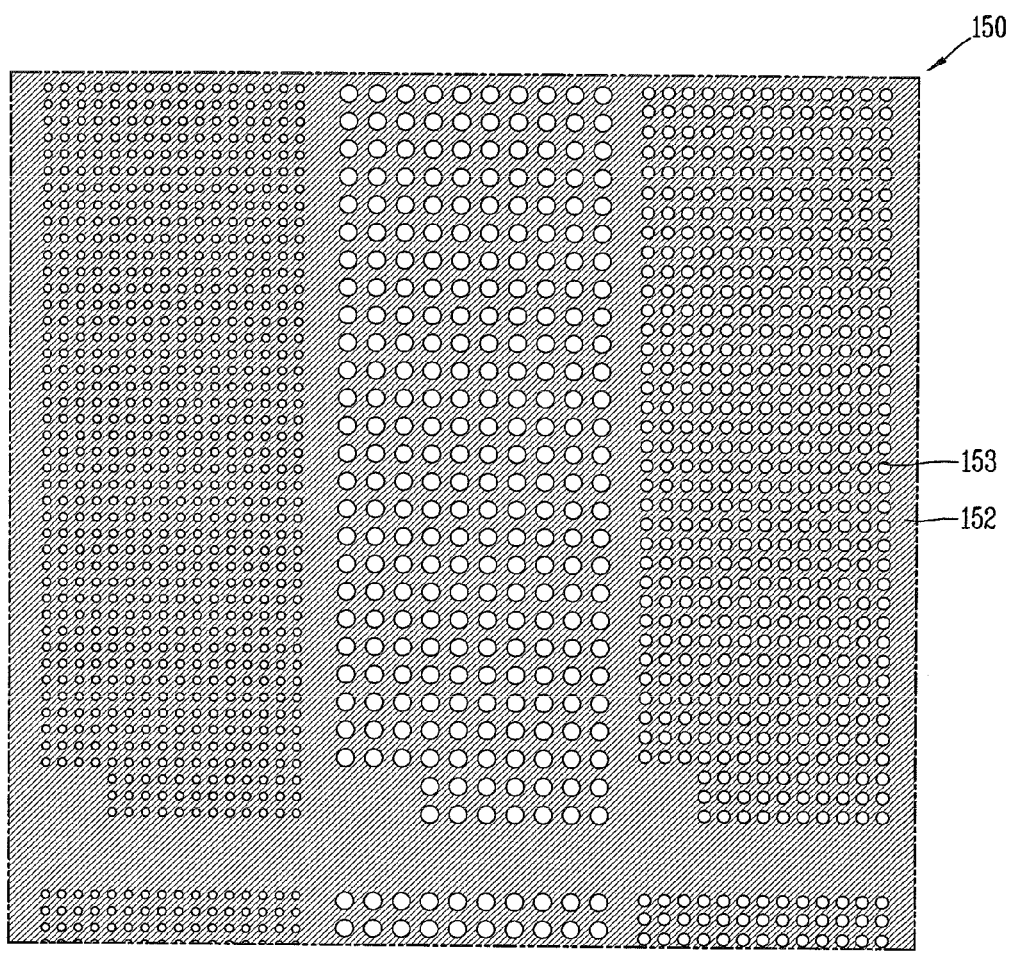
FIG. 4 is a planar view of a color filter in accordance with the first exemplary embodiment of the present invention.

FIG. 4 is a planar view of a color filter in accordance with a first exemplary embodiment of the present invention, which shows a color filter for applying to a twisted nematic (TN) type LCD device in which liquid crystal molecules on the nematic are driven perpendicular to a substrate.

Here, the exemplary drawing illustrates a color filter for one pixel, including sub-color filters corresponding to blue, red and green colors from the left side. Alternatively, the present invention may also be applied for implementing various colors, i.e., more than three primary colors.

As shown in FIG. 4, a color filter 150 in accordance with the first exemplary embodiment of the present invention may include a transmissive pattern 153 including a plurality of sub-wavelength holes having a period, formed through a metal layer 152. Accordingly, an electric field of incident light with wavelengths from visible rays to near-infrared rays is coupled to plasmons, which urges only light with wavelengths respectively corresponding to blue, red, or green colors transmitted and the rest of light all reflected, thereby creating blue, red, or green colors, respectively.

Here, the plurality of sub-wavelength holes of the transmissive layer pattern 153 are formed within a pixel region excluding gate lines, data lines, and regions where TFTs are located.

In addition, the period and the size of the hole may be set to about 300 nm and 155 nm, respectively, for transmission of blue light with 436 nm wavelength. The period and the size of the hole may be set to about 550 nm and 225 nm, respectively, for transmission of red light with 627 nm wavelength. Also, the period and the size of the hole may be set to about 450 nm and 180 nm, respectively, for transmission of green light with 538 nm wavelength.

Figure 5:
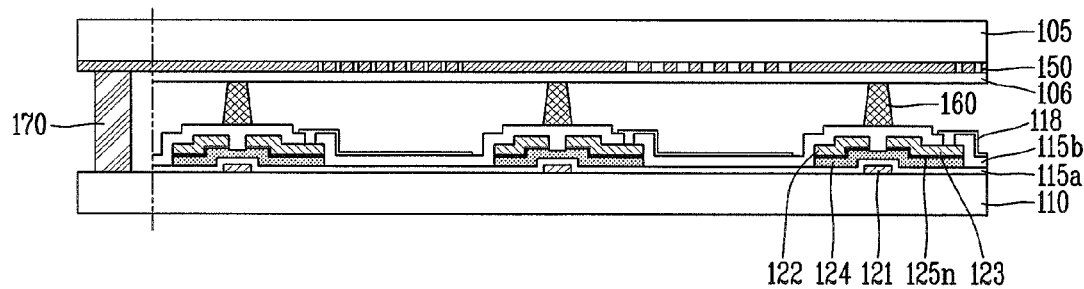
FIGS. 5 to 7 are sectional views showing a structure of an LCD device in accordance with the first exemplary embodiment of the present invention.
Figure 6:
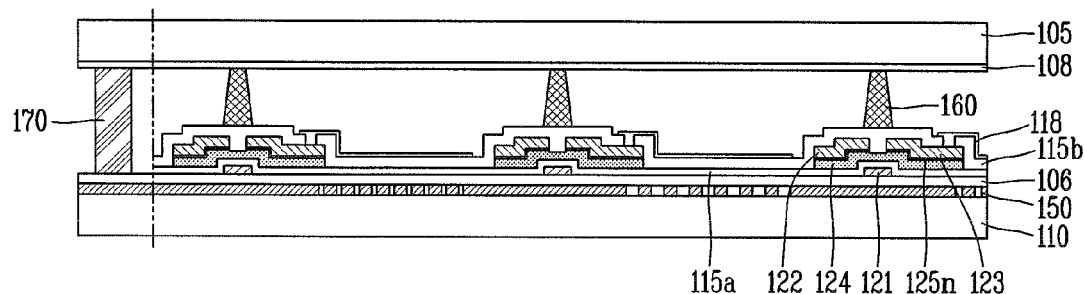
Figure 7:
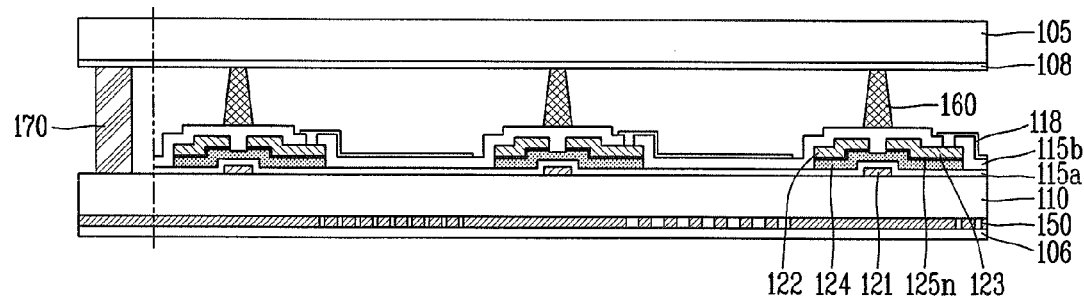

FIGS. 5 to 7 are sectional views showing a structure of an LCD device in accordance with the first exemplary embodiment of the present invention. As shown in FIG. 5, the method for implementing the color filter using surface plasmons in an LCD device, may include a method of forming a color filter 150 according to the first exemplary embodiment of the present invention on an upper color filter substrate 105.

Here, several advantages may be expected. As an example, RGB color filters can be created by forming transmissive patterns at a single metal layer through a one-step process, and then used in place of upper ITO common electrodes, resulting in a simplification of the fabricating process and a reduction of a fabricating cost.

An entire surface of the metal layer of the color filter 150 using the surface plasmons may be coated with an insulating layer having the same refractive index. Hence, for forming the color filter 150 on a glass substrate, it may be appropriate to form, on the glass substrate, an insulating layer (e.g., $SiO_2$, etc.) 106 whose refractive index is the same as that of the glass substrate. Since the surface plasmons are affected by dielectric constants of a metal and an adjacent insulating layer, it would be more efficient to form a binary system.

The color filter substrate 105 and the color filter 150 using the surface plasmons is bonded to an array substrate 110, by a sealant 170 at the edge of an image display region such that a uniform cell gap is maintained therebetween due to a column spacer 160. The array substrate 110 includes a plurality of gate lines (not shown) and data lines (not shown) arranged horizontally and longitudinally to define a plurality of pixel regions, TFTs as switching devices formed at intersections between the gate lines and the data lines, and pixel electrodes 118 formed on the pixel regions.

The color filter 150 may extend up to the outer periphery of the image display region for serving as the ITO common electrode, so the sealant 170 may be located between the color filter 150 of the upper color filter substrate 105 and the lower array substrate 110.

In addition, each TFT includes a gate electrode 121 connected to the gate line, a source electrode 122 connected to the data line, and a drain electrode 123 connected to the pixel electrode 118. The TFT further includes a first insulating layer 115a for insulating the gate electrode 121 from the source and drain electrodes 122 and 123, and an active pattern 124 forming a conductive channel between the source electrode 122 and the drain electrode 123 in response to a gate voltage supplied to the gate electrode 121. The reference numerals 115b and 125n, respectively, denote a second insulating layer and an ohmic-contact layer for ohmic-contact between source and drain regions of the active pattern 124 and the source and drain electrodes 122 and 123.

The color filter using the surface plasmons is not damaged even during a high temperature process due to the use of the metal layer. As a result, the color filter may be formed on the array substrate. FIGS. 6 and 7 illustrate an exemplary method of forming the color filter using the surface plasmons on the lower array substrate.

As shown in FIG. 6, the color filter 150 may be formed within a cell, e.g., below the TFT array. Alternatively, as shown in FIG. 7, the color filter 150 may be formed outside a cell, e.g., on an outer surface of the array substrate 110.

The upper color filter substrate 105 may include a common electrode 108 excluding a color filter and a black matrix. The color filter 150 using the surface plasmons, formed on the array substrate 110, may be floated or grounded.

The sealant 170 may be formed between the common electrode 108 of the upper color filter substrate 105 and the lower array substrate 110 or the color filter 150. Alternatively, upon forming the insulating layer 106 on the color filter 150, the sealant 170 may be formed between the common electrode 108 of the upper color filter substrate 105 and the insulating layer 106 of the array substrate 110.

As such, upon forming the color filter 150 on the array substrate 110, it is not necessary to ensure an alignment margin for the upper color filter substrate 105 and the lower array substrate 110. Further, an aperture ratio can be enhanced, thereby improving a transmittance ratio of the panel. The improvement of the panel transmittance may allow a decrease of brightness of a backlight, thereby reducing power consumption due to the backlight. Due to the decrease in power consumption of the backlight, multi color pixels can be created, which provide a high picture quality with real color reproduction. In addition, if the color filter 150 is formed on the array substrate 110 to cancel the color filter process line, the facility installation costs and the construction costs can effectively be reduced by about 50%.

Description will now be given in detail of an array substrate structure, e.g., when a color filter using surface plasmons is formed on the array substrate and a fabrication method thereof, in a twisted nematic (TN) type LCD device in accordance with the first exemplary embodiment of the present invention, with reference to the accompanying drawings.

Figure 8:
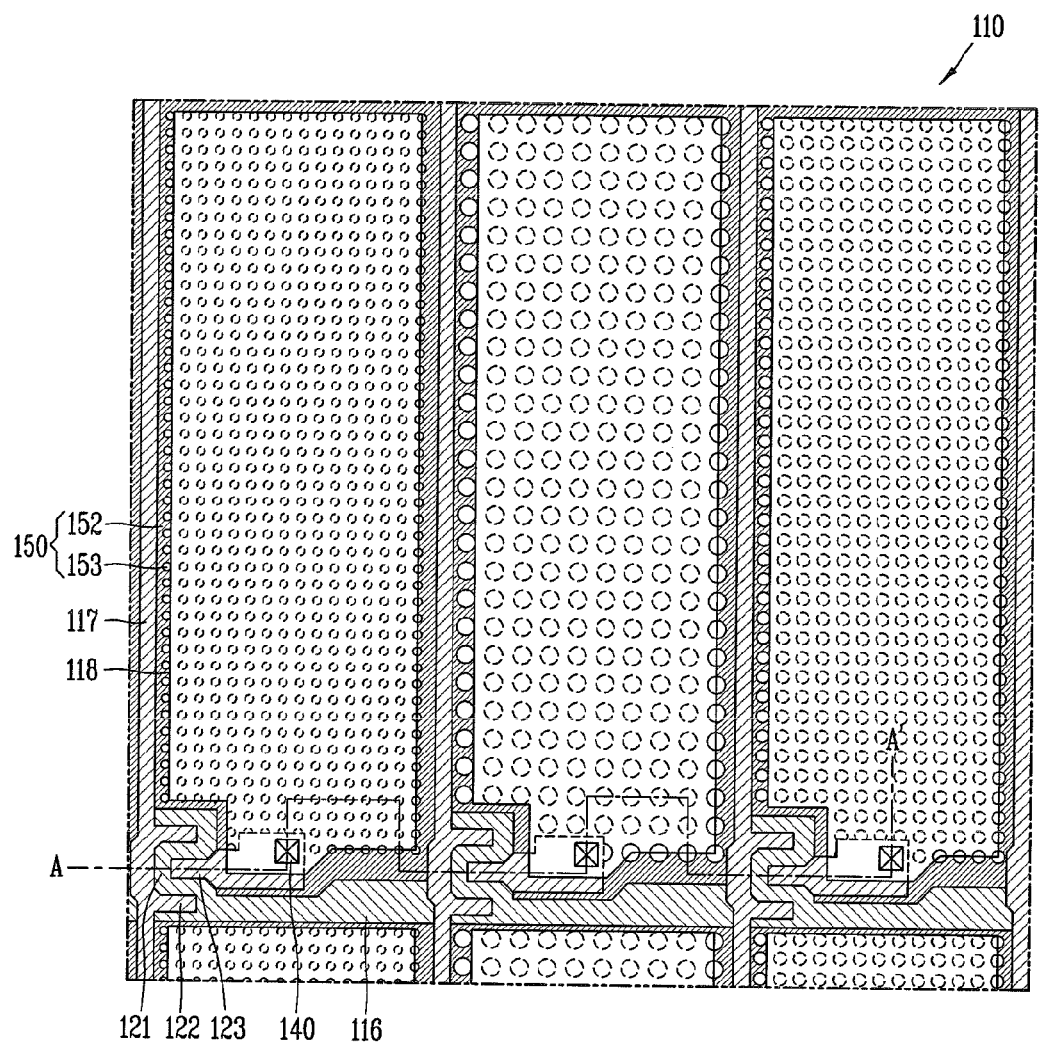
FIG. 8 is a planar view showing a part of the array substrate of the LCD device according to the first exemplary embodiment shown in FIG. 6.

FIG. 8 is a planar view showing a part of the array substrate of the LCD device according to the first exemplary embodiment shown in FIG. 6. For the purpose of explanation, one pixel composed of sub-color filters corresponding to blue, red and green colors from the left side in the drawing is exemplarily illustrated. However, the present invention may not be limited to the pixel structure, but applicable to implement multi-colors more than three primary colors.

The first exemplary embodiment of the present invention illustrates a TN type LCD device which drives liquid crystal molecules on a nematic perpendicular to a substrate. The sub-color filters corresponding to the blue, red and green colors substantially include the same components excluding the structure of the color filter, e.g., size and period (interval) of a transmissive pattern.

As shown in FIG. 8, the array substrate 110 according to the first exemplary embodiment includes gate lines 116 and data lines 117 arranged on the array substrate 110 horizontally and longitudinally to define pixel regions. Also, a thin film transistor (TFT) as a switching device is formed on each intersection between the gate line 116 and the data line 117, and a pixel electrode 118 is formed on each pixel region. The pixel electrode 118 is connected to the TFT to drive a liquid crystal layer in cooperation with a common electrode of a color filter substrate (not shown).

The TFT may include a gate electrode 121 forming part of the gate line 116, a source electrode 122 connected to the data line 117 and a drain electrode 123 connected to the pixel electrode 118. The TFT may further include a first insulating layer (not shown) to insulate between the gate electrode 121 from the source and drain electrodes 122 and 123, and an active pattern (not shown) for forming a conductive channel between the source electrode 122 and the drain electrode 123 in response to a gate voltage supplied to the gate electrode 121.

The source electrode 122 partially extends in one direction to realize a part of the data line 117. The drain electrode 123 partially extends toward the pixel region so as to be electrically connected to the pixel electrode 118 via a contact hole 140 formed at the second insulating layer (not shown).

The color filter 150 using surface plasmons according to the first exemplary embodiment is located at the lowest layer of the array substrate 110 having such configuration. The color filter 150 includes a transmissive pattern 153 formed through a metal layer 152 comprising a plurality of sub-wavelength holes having a period L. An electric field of incident light (ray) with wavelengths from visible rays to near-infrared rays is coupled to plasmons. Consequently, only light with specific wavelengths corresponding to blue, red, or green colors are transmitted and the rest are all reflected, thereby realizing blue, red, or green colors, respectively.

FIGS. 9A to 9E are planar views sequentially showing a fabrication process of the array substrate shown in FIGS. 6 and 8. FIGS. 10A to 10E are sectional views sequentially showing the fabricating process of the array substrate shown in FIGS. 6 and 8.

Figure 9A:
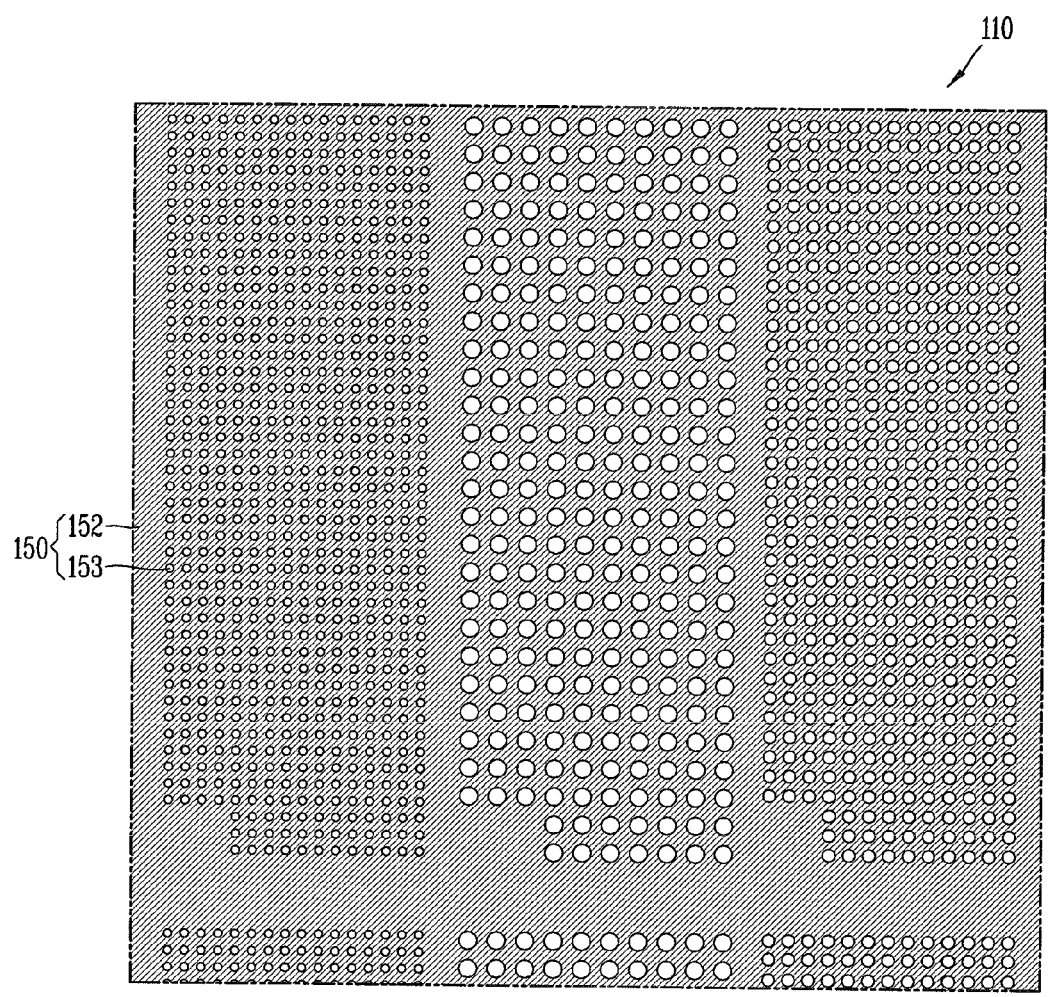
FIGS. 9A to 9E are planar views sequentially showing a fabrication process of the array substrate shown in FIGS. 6 and 8.
Figure 10A:
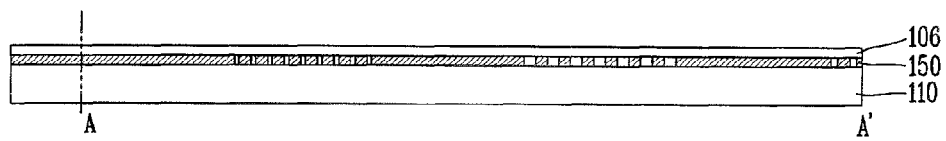
FIGS. 10A to 10E are sectional views sequentially showing the fabricating process of the array substrate shown in FIGS. 6 and 8.

As shown in FIGS. 9A and 10A, a color filter 150 using surface plasmons is formed on an array substrate 110 formed of a transparent insulating material, such as glass. The color filter 150 includes a transmissive pattern 153 formed in a metal layer 152 and includes a plurality of sub-wavelength holes having a period L. The transmissive pattern 153 may be made of a transparent polymer, spin on glass (SOG), organic or inorganic material or the like, which have a high light transmittance and a high optical property. The metal layer 152 may be made of aluminum, molybdenum, copper, gold, silver, chromium or the like.

The color filter 150 may be made in a manner that the transmissive pattern 153 is formed by soft molding, capillary force lithography, polymer layer transition patterning using a rigiflex mold, patterning using UV curable polymer or the like, followed by a metal layer deposition and planarization process. The present invention is not limited to the method of forming the color filter 150.

The color filter 150 having such structure in accordance with the first exemplary embodiment of the present invention can implement RGB colors by selectively transmitting a red color through red color transmissive patterns within a red color region, by selectively transmitting a green color through green color transmissive patterns within a green color region, and by selectively transmitting a blue color through a blue color transmissive pattern within a blue color region.

In the structure of the color filter 150 according to the first exemplary embodiment of the present invention, transmissive patterns, i.e., hole patterns corresponding to blue, red and green sub-pixels have been formed in different sizes. Further, the metal layer has been formed with a different thickness to increase transmission efficiency. In particular, thick red color transmissive patterns are formed in the red color region. Green color transmissive patterns are thinner than at least the red color transmissive patterns. The thinnest blue color transmissive patterns are formed in the color region. However, the present invention may not be limited to this. Upon forming the color filter 150 on a glass substrate, the same insulating layer (SiO$_2$, etc.) 106 as the glass substrate may be formed on the array substrate 110 having the color filter 150 thereon.

Figure 9B:
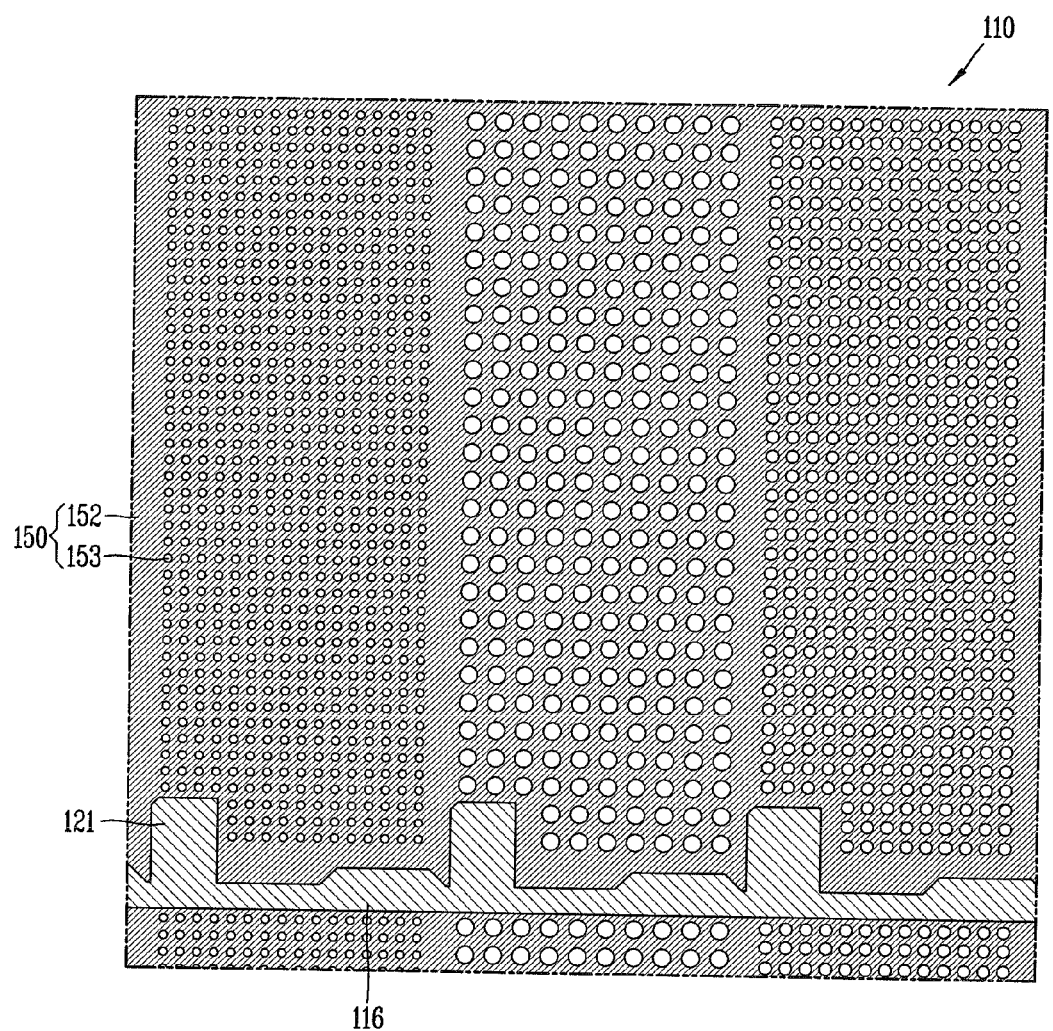
Figure 10B:
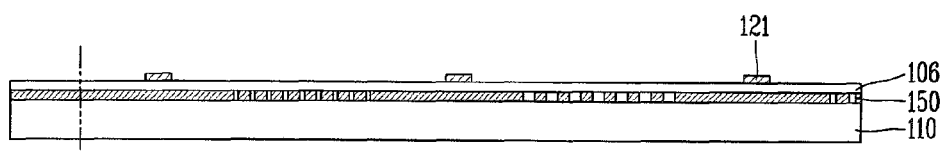

As shown in FIGS. 9B and 10B, the gate electrode 121 and the gate line 116 are formed on the array substrate 110 having the insulating layer 160 formed thereon.

The gate electrode 121 and the gate line 116 may be formed by depositing a first conductive film on the entire surface of the array substrate 110 and performing a selective patterning for the same through a photolithography process.

The first conductive film may be made of a low-resistance opaque conductive material, examples of which include aluminum (Al), Al alloy, tungsten (W), copper (C), chromium (Cr), molybdenum (Mo), Mo alloy and the like. The first conductive film may be formed in a multi-layered structure having two or more low-resistance conductive materials deposited.

Figure 9C:
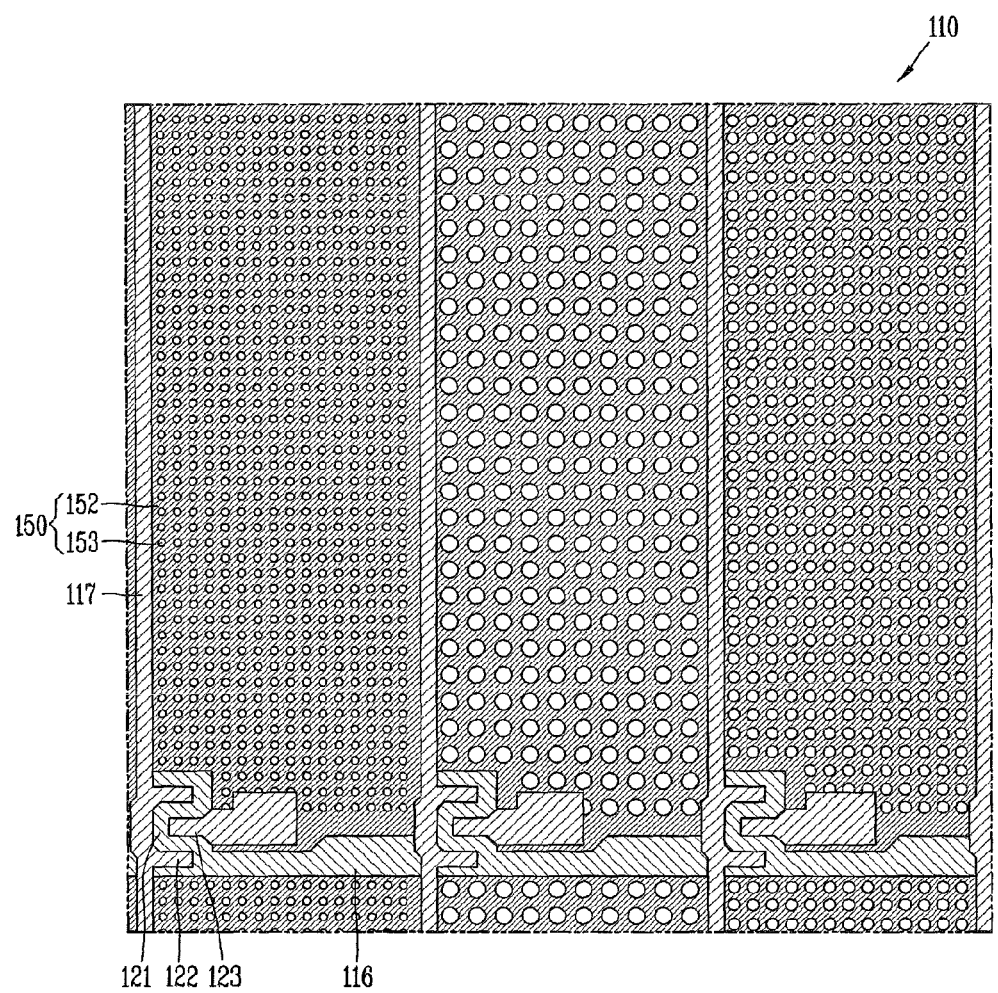
Figure 10C:
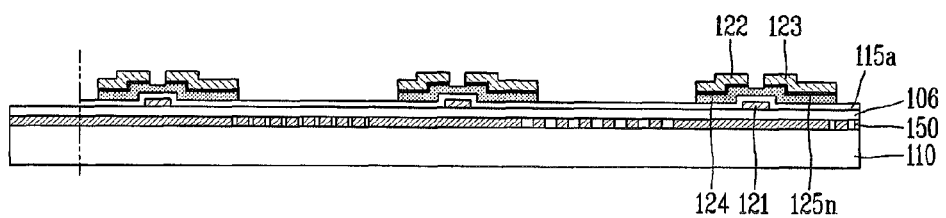

As shown in FIGS. 9C and 10C, the entire surface of the array substrate 110 having the gate electrode 121 and the gate line 116 is sequentially deposited with a first insulating layer 115a, an amorphous silicon thin film, n+ amorphous silicon thin film, and a second conductive film, which are thereafter selectively removed through a photolithography process, thereby forming an active pattern 124 made of the amorphous silicon thin film on the array substrate 110. The source and drain electrodes 122 and 123, which are made of the second conductive film and electrically connected to source and drain regions of the active pattern 124, are formed.

The data line 117, which is made of the second conductive film and defines a pixel region by intersecting with the gate line 116, is formed through the photolithography process. An ohmic-contact layer 125n, which is made of the n+ amorphous silicon thin film and patterned into the same shape as the source and drain electrodes 122 and 123, is formed on the active pattern 124. The active pattern 124, the source and drain electrodes 122 and 123 and the data line 117 according to the first exemplary embodiment of the present invention may simultaneously be formed through a one-time masking process using a half-tone mask or diffraction mask.

The second conductive film may be made of a low-resistance opaque conductive material, examples of which include aluminum (Al), Al alloy, tungsten (W), copper (C), chromium (Cr), molybdenum (Mo), Mo alloy and the like. The second conductive film may be formed in a multi-layered structure having two or more low-resistance conductive materials deposited.

Figure 9D:
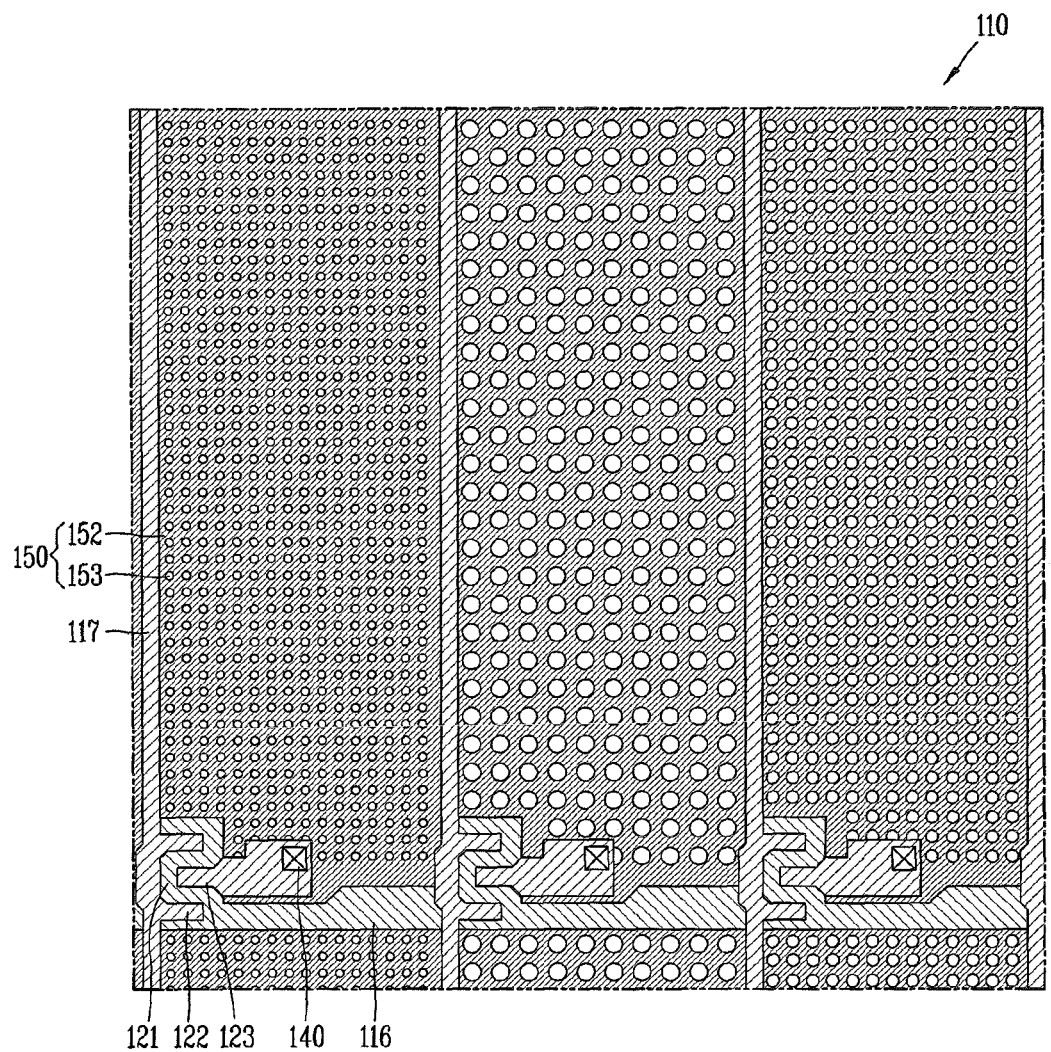
Figure 10D:
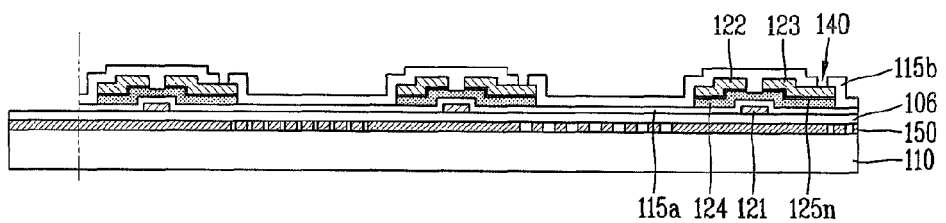

As shown in FIGS. 9D and 10D, the second insulating layer 115b is selectively removed through the photolithography process, thereby forming a contact hole 140 on the array substrate 110 for partially exposing the drain electrode 123, after forming a second insulating layer 115b on the entire surface of the array substrate 110, on which the active pattern 124, the source and drain electrodes 122 and 123 and the data line 117 are formed.

The second insulating layer 115b may be made of silicon nitride or silicon oxide, or alternatively, an organic insulating layer, such as photoacryl or benzcclobutene (BCB).

Figure 9E:
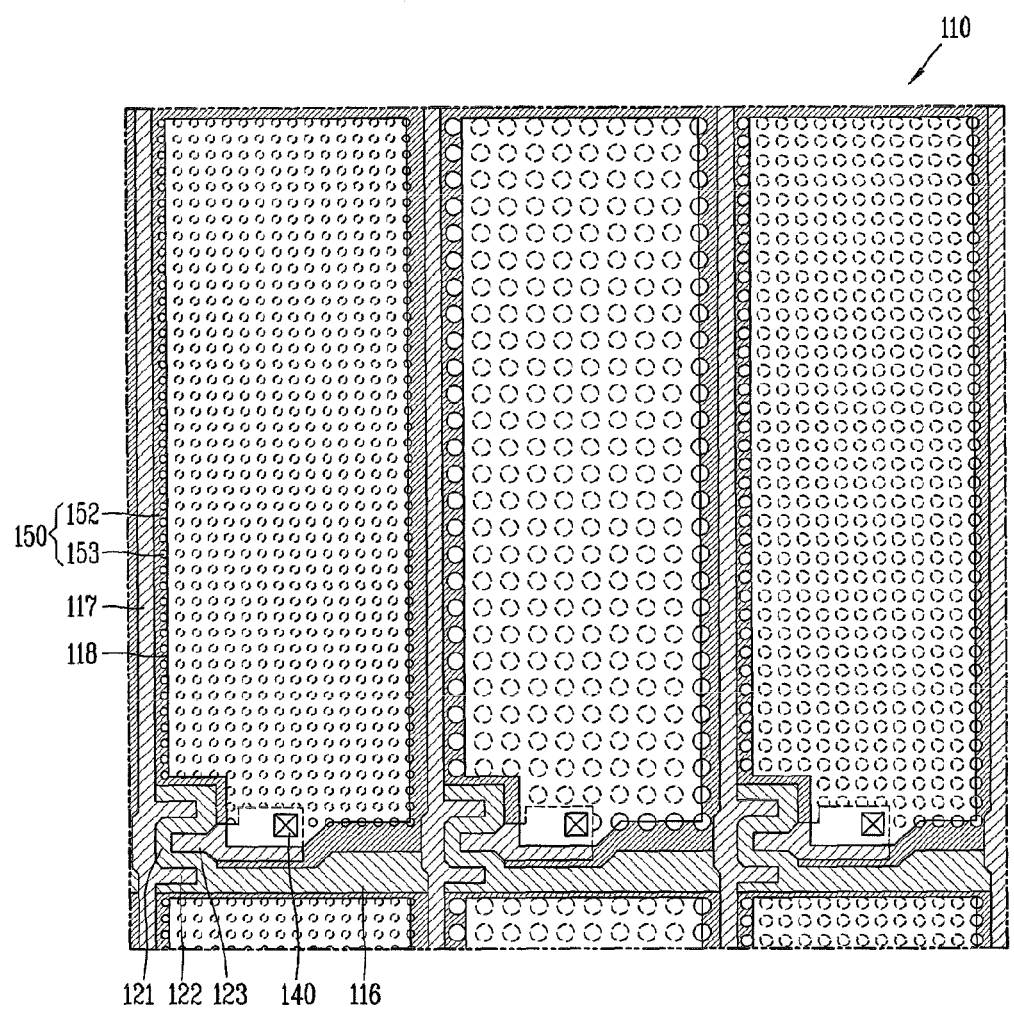
Figure 10E:
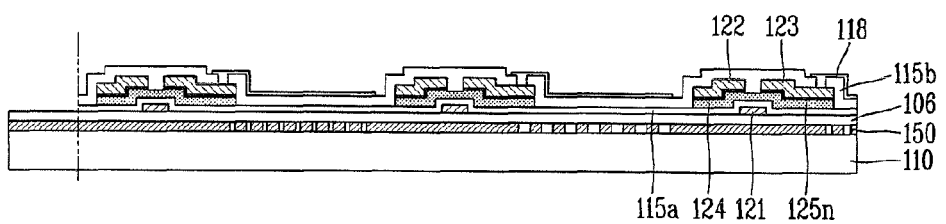

As shown in FIGS. 9E and 10E, after forming a third conductive film on the entire surface of the array substrate 110, on which the second insulating layer 115b is formed, the third conductive film is selectively removed through the photolithography process, thereby forming the pixel electrode 118, which is electrically connected to the drain electrode 123 via the contact hole 140. The third conductive film may be made of a transparent conductive material having a high transmittance, such as indium tin oxide (ITO) or indium zinc oxide (IZO).

The foregoing description according to the first exemplary embodiment of the present invention is of the TN type LCD device which drives liquid crystal molecules on the nematic perpendicular to the substrate. However, the present invention may not be limited to this. The present invention may also be applicable to an in plane switching (IPS) type LCD device which drives liquid crystal molecules horizontal to the substrate so as to improve a viewing angle to more than 170°.

Figure 11:
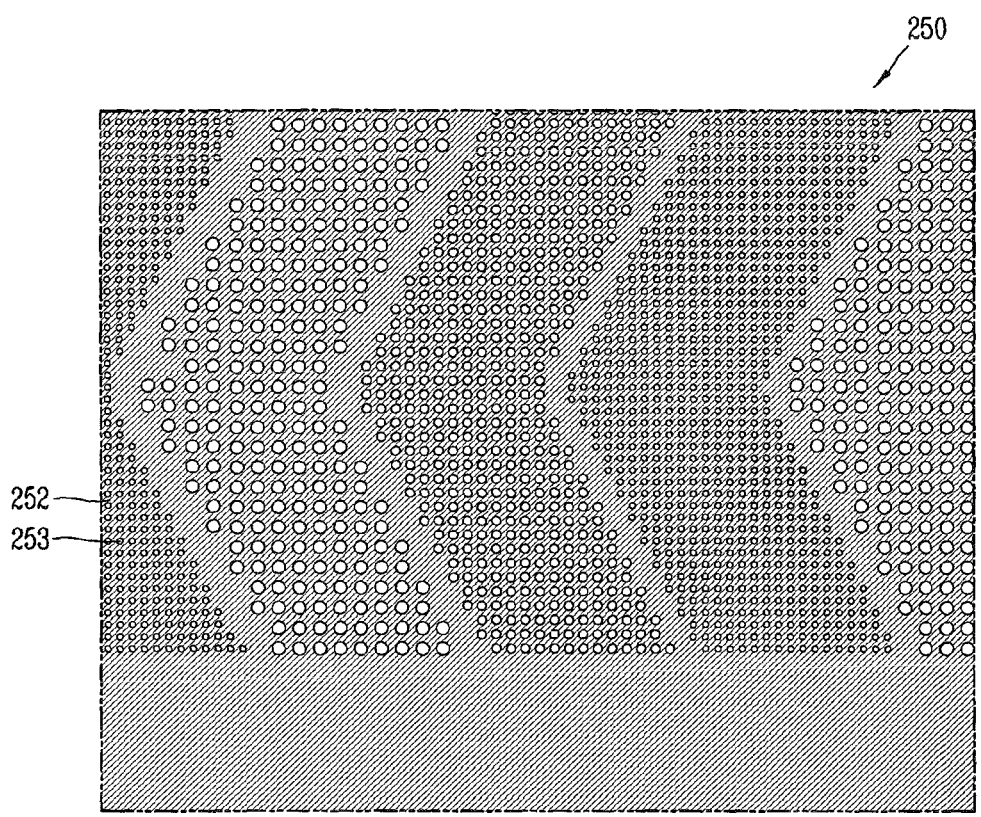
FIG. 11 is a planar view showing a color filter in accordance with a second exemplary embodiment of the present invention.

FIG. 11 is a planar view showing a color filter in accordance with a second exemplary embodiment of the present invention, which illustrates a color filter to be applied to the IPS type LCD device, which drives liquid crystal molecules horizontal to the substrate so as to improve a viewing angle to more than 170°. Here, for the purpose of explanation, a color filter for one pixel composed of sub-colors corresponding to blue, red and green colors from the left side in the drawing is exemplarily illustrated. However, the present invention is not limited to the pixel structure, but is applicable to implement multi-colors, i.e., more than three primary colors.

As shown in FIG. 11, the color filter 250 includes a transmissive pattern 253 formed in a metal layer 252 comprising a plurality of sub-wavelength holes having a period L. An electric field of incident light (ray) with wavelengths from visible rays to near-infrared rays is coupled to plasmons. Consequently, only light with specific wavelengths corresponding to blue, red, or green colors are transmitted and the rest are all reflected, thereby realizing blue, red, or green colors, respectively.

The transmissive layer patterns 253 are formed within a pixel region excluding the gate line, the data line, and the region where the TFT is located.

In addition, a cross-sectional view of the hole of the transmissive pattern may have various shapes, such as oval, triangle, square, rectangle and the like, without being limited to a circular shape such as a hole. For a circular hole, it may have a diameter in the range of 100 to 300 nm and an period in the range of 300 to 700 nm. The period and the size of the hole may be set to about 300 nm and 155 nm, respectively, for transmission of blue light with 436 nm wavelength. The period and the size of the hole may be set to about 550 nm and 225 nm, respectively, for transmission of red light with 627 nm wavelength. Also, the period and the size of the hole may be set to about 450 nm and 180 nm, respectively, for transmission of green light with 538 nm wavelength.

Figure 12:
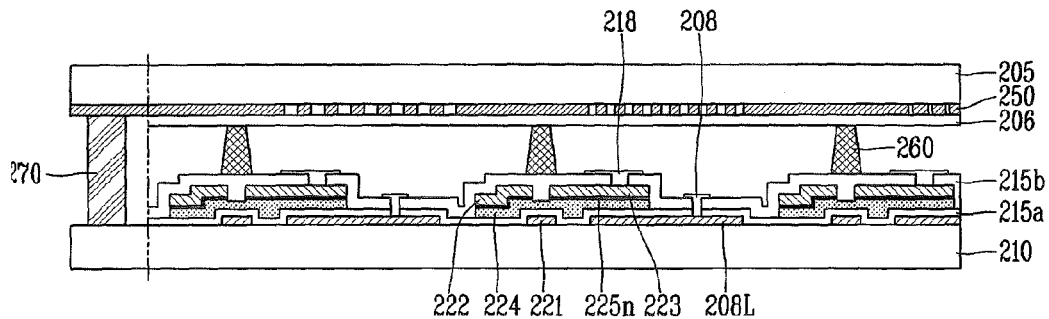
FIGS. 12 to 14 are sectional views showing a structure of the LCD device in accordance with the second exemplary embodiment of the present invention.
Figure 13:
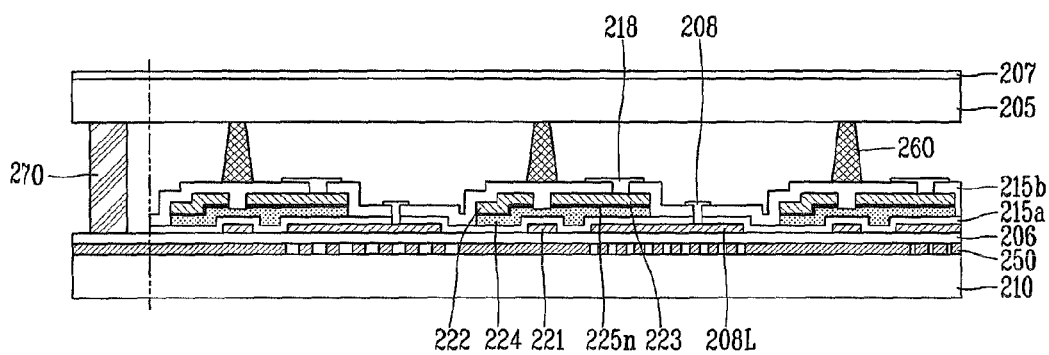
Figure 14:
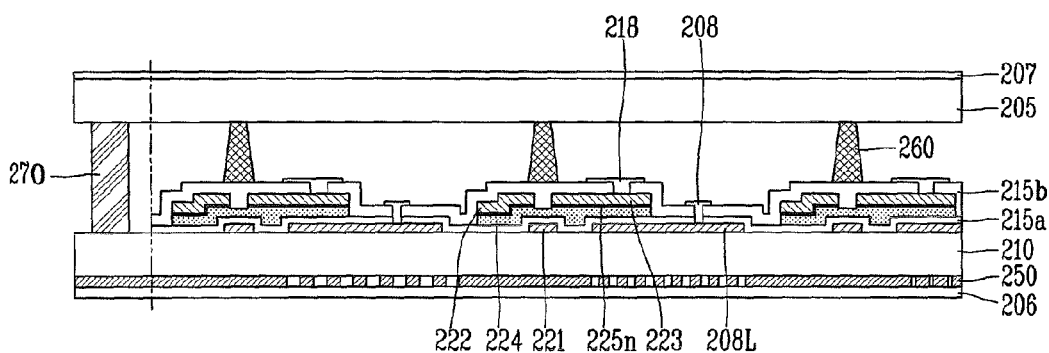

FIGS. 12 to 14 are sectional views showing a structure of the LCD device in accordance with the second exemplary embodiment of the present invention. As shown in FIG. 12, the method for implementing the color filter using surface plasmons in an LCD device may include a method of forming a color filter 250 according to the second exemplary embodiment of the present invention on an upper color filter substrate 205.

Here, several advantages may be expected. For example, RGB color filters can be created by forming a transmissive pattern at a single metal layer through a one-step process, and then used in place of upper ITO rear electrodes, resulting in a simplification of the entire process and a reduction of a fabricating cost.

An entire surface of the metal layer of the color filters 250 using the surface plasmons may be coated with an insulating layer having the same refractive index. Hence, for forming the color filter 250 on a glass substrate, it may be appropriate to form, on the glass substrate, an insulating layer (e.g., SiO$_2$, etc.) 206 having the same refractive index as that of the glass substrate.

The color filter substrate 205 and the color filter 250 using the surface plasmons is bonded to an array substrate 210 by a sealant 270 at an edge of an image display region such that a uniform cell gap is maintained therebetween due to a column spacer 260. The array substrate 210 includes a plurality of gate lines (not shown) and data lines (not shown) arranged horizontally and longitudinally to define a plurality of pixel regions, TFTs as switching devices formed at intersections between the gate lines and the data lines, and pixel electrodes 218 and common electrodes 208 alternately arranged on the pixel regions to generate transversal fields.

The color filter 250 may extend up to the outer periphery of the image display region for serving as the ITO rear electrode, so the sealant 270 may be located between the color filter 250 of the upper color filter substrate 205 and the lower array substrate 210.

In addition, each TFT includes a gate electrode 221 connected to the gate line, a source electrode 222 connected to the data line, and a drain electrode 223 connected to the pixel electrode 218. The TFT further includes a first insulating layer 215a for insulating the gate electrode 221 from the source and drain electrodes 222, 223, and an active pattern 224 forming a conductive channel between the source electrode 222 and the drain electrode 223 in response to a gate voltage supplied to the gate electrode 221. A second insulating layer 215b and an ohmic-contact layer 225n for ohmic-contact between source and drain regions of the active pattern 224 and the source and drain electrodes 222 and 223 may also be provided.

FIGS. 13 and 14 show an exemplary method of forming the color filter using surface plasmons on the lower array substrate. As shown in FIG. 13, the color filter 250 may be formed within a cell, e.g., on a lower surface of the TFT array. Alternatively, as shown in FIG. 7, the color filter 250 may be formed outside a cell, e.g., on an outer surface of the array substrate 210.

The upper color filter substrate 205 may include another component, e.g., an ITO rear electrode 207 for preventing static electricity, excluding a color filter and a black matrix. The color filter 250 using the surface plasmons, formed on the array substrate 210, may be floated or grounded.

The sealant 270 may be formed between the upper color filter substrate 205 and the lower array substrate 210 or the color filter 250. Alternatively, upon forming the insulating layer 206 on the color filter 250, the sealant 270 may be formed between the upper color filter substrate 205 and the insulating layer 206 of the array substrate 210.

As such, upon forming the color filter 250 on the array substrate 210, it is not necessary to ensure an alignment margin for the upper color filter substrate 205 and the lower array substrate 210. Further, an aperture ratio can be enhanced, thereby improving a transmittance ratio of the panel. The improvement of the panel transmittance may allow a decrease of brightness of a backlight, thereby reducing power consumption due to the backlight. As the power consumption of the backlight can be decreased, multi-color pixels can be created to obtain a high picture quality with real color reproduction. In addition, if the color filter 250 is formed on the array substrate 210 to cancel the color filter process line, the facility installation costs and construction costs can effectively be reduced by about 50%.

Description will now be given in detail of an array substrate structure, e.g., when a color filter using surface plasmons is formed on the array substrate, and a fabrication method thereof, in an IPS type LCD device in accordance with a second exemplary embodiment of the present invention, with reference to the accompanying drawings.

Figure 15:
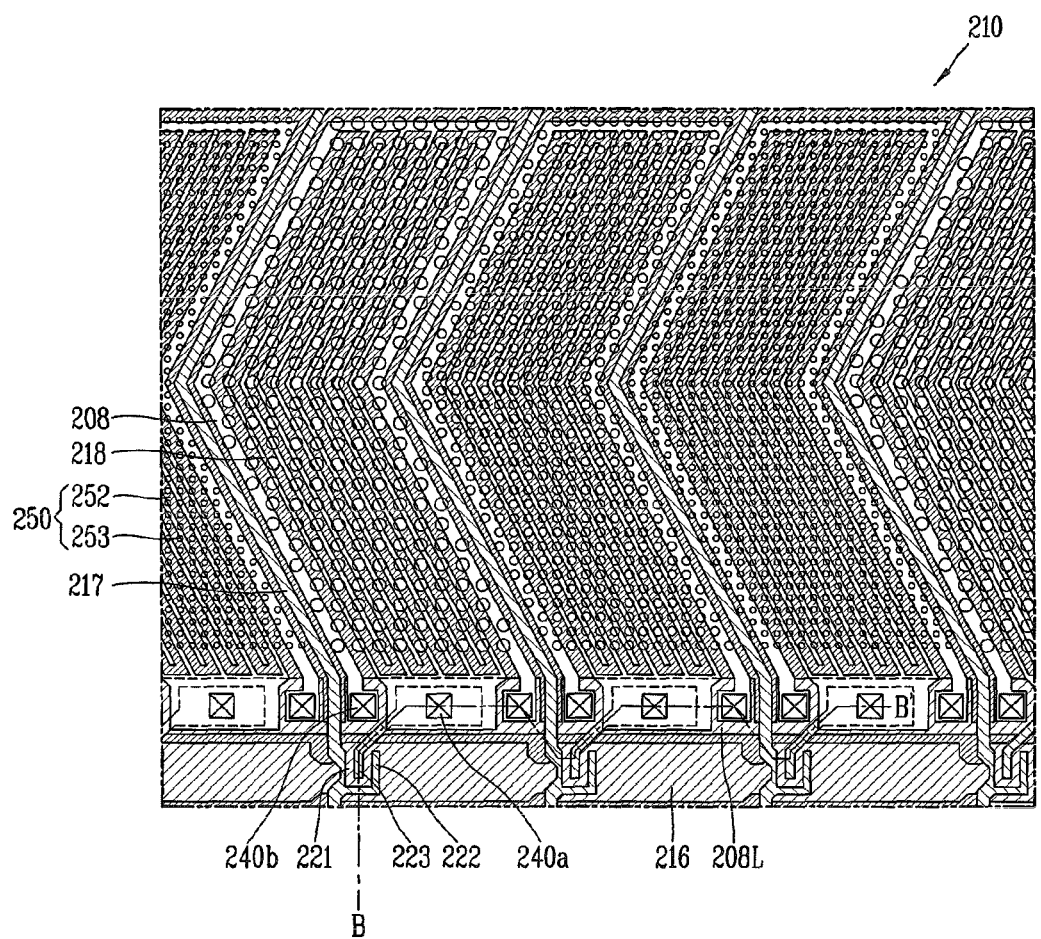
FIG. 15 is a planar view showing a part of the array substrate of the LCD device according to the second exemplary embodiment shown in FIG. 13.

FIG. 15 is a planar view showing a part of the array substrate of the LCD device according to the second exemplary embodiment shown in FIG. 13. For the purpose of explanation, one pixel composed of sub-color filters corresponding to blue, red and green colors from the left side in the drawing is exemplarily illustrated. However, the present invention may not be limited to the pixel structure, but applicable to implementing various primary colors, i.e., more than three primary colors.

The second exemplary embodiment of the present invention illustrates an IPS type LCD device, which drives liquid crystal molecules horizontal to the substrate so as to improve a viewing angle more than 170°. The sub-color filters corresponding to the blue, red and green colors substantially include the same components excluding the structure of the color filter, e.g., size and period of a transmissive pattern.

As shown in FIG. 15, the array substrate 210 according to the second exemplary embodiment includes gate lines 216 and data lines 217 arranged on the array substrate 210 horizontally and longitudinally to define pixel regions. Also, a thin film transistor (TFT) as a switching device is formed on each intersection between the gate line 216 and the data line 217. A common electrode 208 and a pixel electrode 218 which drive liquid crystal (not shown) by generating a transversal field are alternately formed in each pixel region.

The TFT may include a gate electrode 221 forming part of the gate line 216, a source electrode 222 connected to the data line 217 and a drain electrode 223 connected to the pixel electrode 218. The TFT may further include a first insulating layer (not shown) to insulate the gate electrode 221 from the source and drain electrodes 222 and 223, and an active pattern (not shown) for forming a conductive channel between the source electrode 222 and the drain electrode 223 in response to a gate voltage supplied to the gate electrode 221. Here, the source electrode 222 is shown in a "U" shape in the drawing, so the TFT is also implemented in a "U" shape. However, the present invention may not be limited to this shape, but be applicable irrespective of the shape of the channel of the TFT.

The source electrode 222 partially extends in one direction to realize a part of the data line 217. The drain electrode 223 partially extends toward the pixel region so as to be electrically connected to the pixel electrode 218 via a first contact hole 240a formed at the second insulating layer (not shown). A plurality of common electrodes 208 and pixel electrodes 218 for generating transversal fields are alternately arranged in the pixel regions.

A common line 208L substantially in parallel to the gate line 216 is formed at a lower end of each pixel region. The common electrode 208 is electrically connected to the common line 208L via a second contact hole 240b formed at the first insulating layer and the second insulating layer.

As shown in FIG. 15, the common electrodes 208, the pixel electrodes 218 and the data lines 217 according to the second exemplary embodiment of the present invention have a bent structure. Accordingly, liquid crystal molecules are aligned in two directions to define two domains, thereby further improving a viewing angle as compared to a mono-domain. Here, the present invention may not be limited to the IPS type LCD device with the two-domain structure, but is also applicable to an IPS type LCD device with a multi-domain structure more than two domains. In particular, the IPS structure forming the multi domains more than two domains is referred to as a super-IPS (S-IPS) structure.

If the bent structure of the common electrodes 208, the pixel electrodes 218, and the data lines 217 is employed to implement the multi-domain structure having symmetrical driving directions of liquid crystal molecules, abnormal light due to birefringence characteristics of liquid crystal may be attenuated, thereby minimizing a color shift phenomenon.

The color filter 250 using surface plasmons according to the second exemplary embodiment is located at the lowest layer of the array substrate 210 having such configuration. The color filter 250 includes a transmissive pattern 253 formed through a metal layer 252 comprising a plurality of sub-wavelength holes having a period L. An electric field of incident light (ray) with wavelengths from visible rays to near-infrared rays is coupled to plasmons. Consequently, only light with specific wavelengths corresponding to blue, red, or green colors are transmitted and the rest are all reflected, thereby realizing blue, red, or green colors, respectively.

Figure 16A:
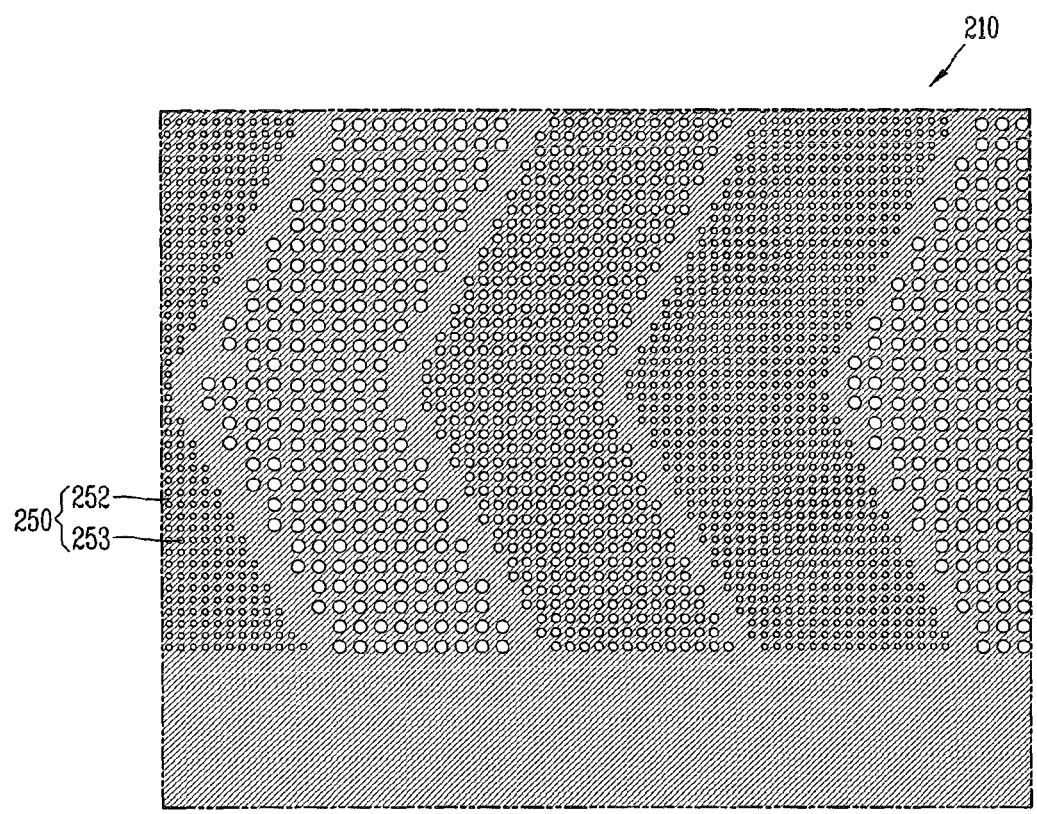
FIGS. 16A to 16E are planar views sequentially showing a fabrication process of the array substrate shown in FIGS. 13 and 15.

FIGS. 16A to 16E are planar views sequentially showing a fabrication process of the array substrate shown in FIGS. 13 and 15. FIGS. 17A to 17E are sectional views sequentially showing the fabrication process of the array substrate shown in FIGS. 13 and 15. As shown in FIGS. 16A and 17A, a color filter 250 using surface plasmons is formed on an array substrate 210 formed of a transparent insulating material, such as glass. The color filter 250 includes a transmissive pattern 253 formed through a specific metal layer 252 including a plurality of sub-wavelength holes having a period L. The transmissive pattern 253 may be made of a transparent polymer, spin on glass (SOG), organic or inorganic material or the like, which has a high light transmittance and a high optical property. The metal layer 252 may be made of aluminum, molybdenum, copper, gold, silver, chromium or the like.

The color filter 250 may be made in a manner that the plurality of sub-wavelength holes of the transmissive patterns 253 are formed by soft molding, capillary force lithography, polymer layer transition patterning using a rigiflex mold, patterning using UV curable polymer or the like, followed by a metal layer deposition and planarization process. Here, the present invention may not be limited to the method of forming the color filter 250.

The color filter 250 having such structure in accordance with the second exemplary embodiment of the present invention can implement RGB colors by selectively transmitting a red color through red color transmissive patterns within a red color region, by selectively transmitting a green color through green color transmissive patterns within a green color region, and by selectively transmitting a blue color through a blue color transmissive pattern within a blue color region.

In the structure of the color filter 250 according to the second exemplary embodiment of the present invention, transmissive patterns, e.g., hole patterns corresponding to blue, red and green sub-pixels have been formed in different sizes. Further, the metal layer has been formed in a different thickness to increase transmission efficiency. In particular, thick red color transmissive patterns are formed on the red color region. Green color transmissive patterns are thinner than at least the red color transmissive pattern. The thinnest color transmissive patterns are formed on the blue color region. However, the present invention may not be limited to this.

Upon forming the color filter 250 on a glass substrate, the same insulating layer 206 ($SiO_2$, etc.) as the glass substrate may be formed on the array substrate 210 having the color filter 250 thereon.

Figure 16B:
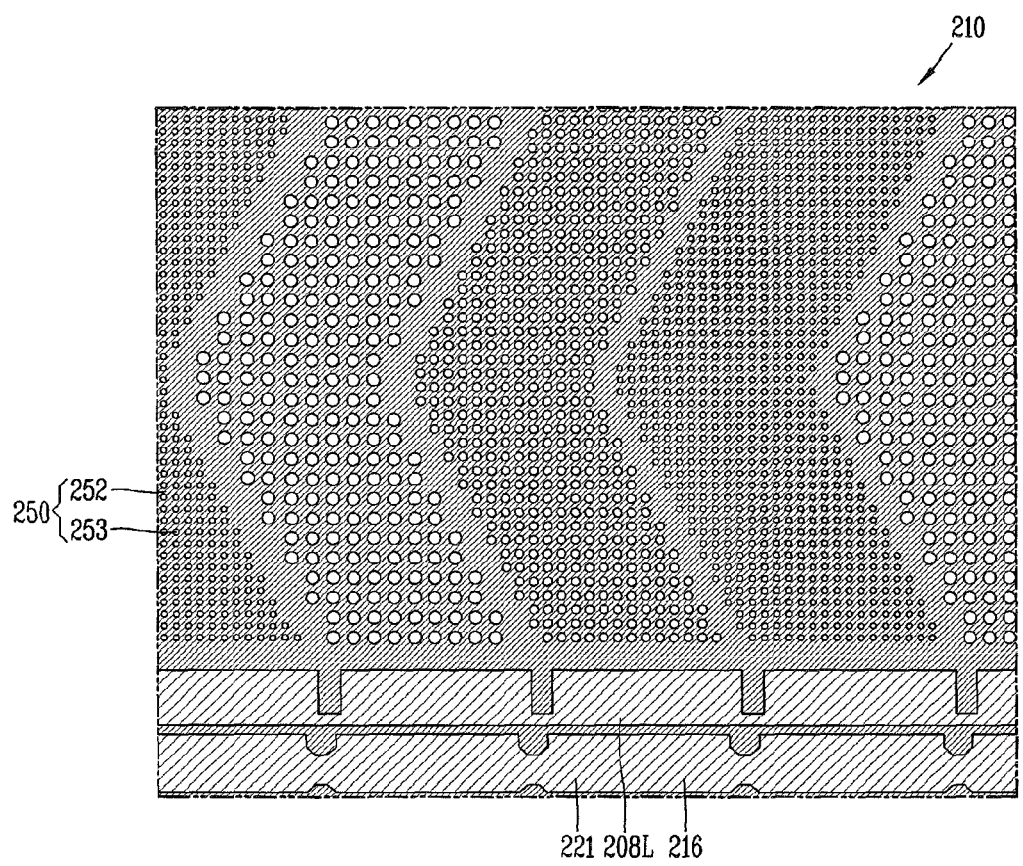
Figure 17A:
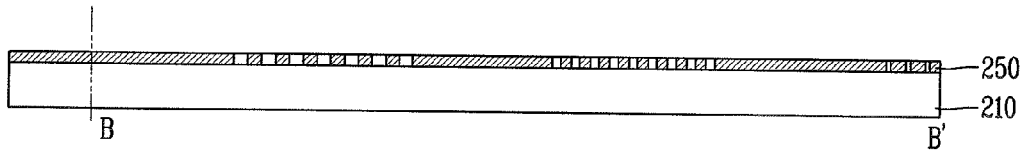
FIGS. 17A to 17E are sectional views sequentially showing the fabrication process of the array substrate shown in FIGS. 13 and 15.
Figure 17B:
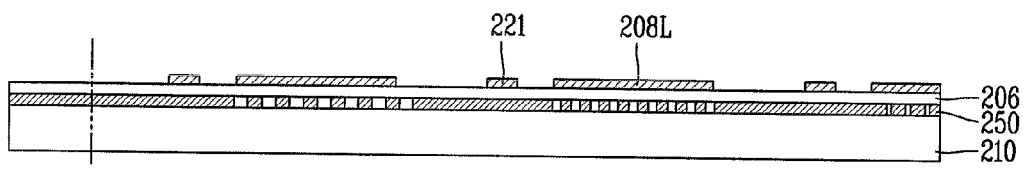

As shown in FIGS. 16B and 17B, the gate electrode 221, the gate line 116 and the common line 208L are formed on the array substrate 210 having the insulating layer 206 formed thereon.

The gate electrode 221, the gate line 116 and the common line 208L may be formed by depositing a first conductive film on the entire surface of the array substrate 210 and performing a selective patterning for the same through a photolithography process.

Figure 16C:
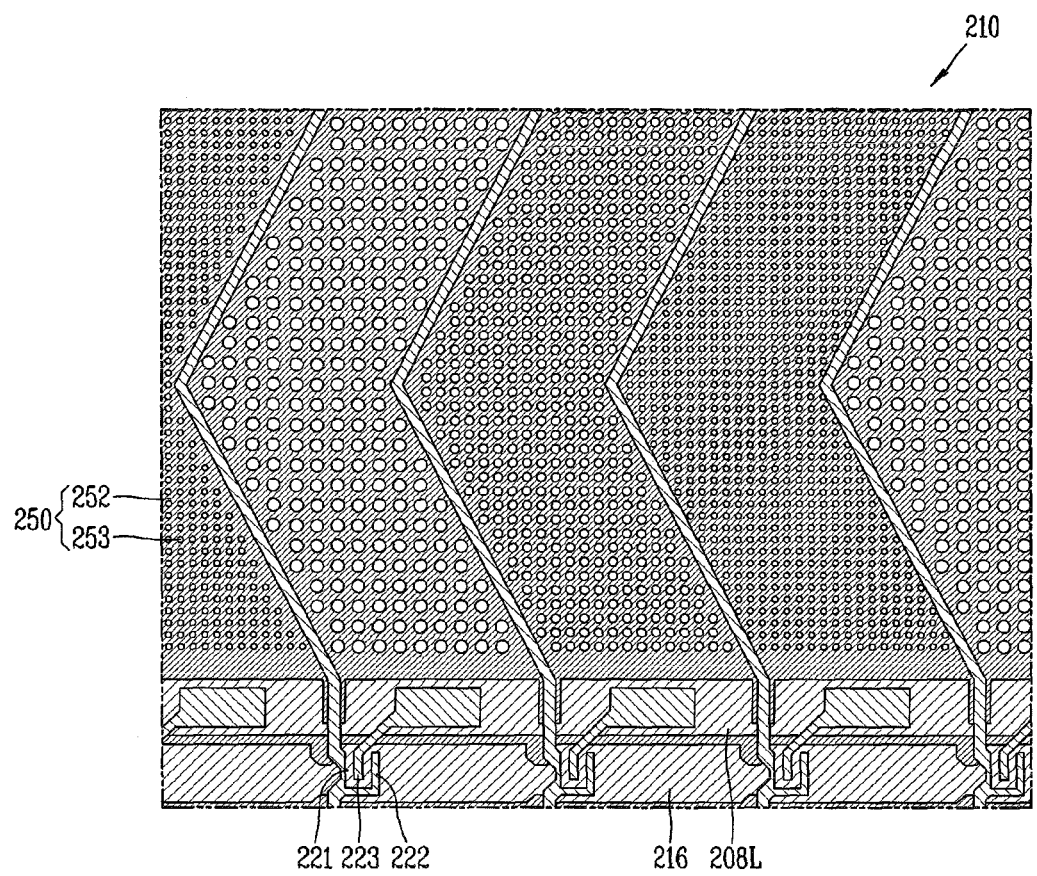
Figure 17C:
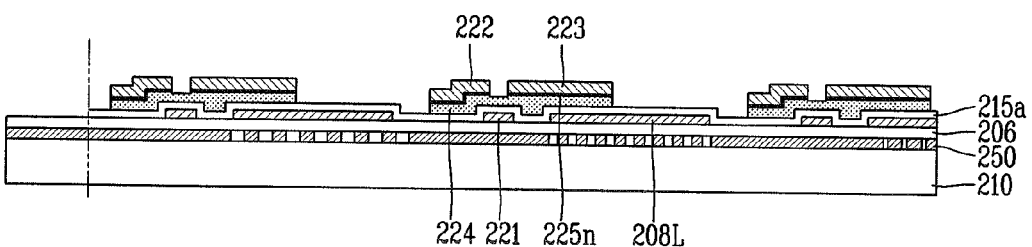

As shown in FIGS. 16C and 17C, the entire surface of the array substrate 210 having the gate electrode 221, the gate line 216 and the common line 208L is sequentially deposited with a first insulating layer 215a, an amorphous silicon thin film, n+ amorphous silicon thin film, and a second conductive film, which are thereafter selectively removed through a photolithography process, thereby forming the active pattern 224 made of the amorphous silicon thin film on the array substrate 210. The source and drain electrodes 222 and 223, which are made of the second conductive film and electrically connected to source and drain regions of the active pattern 224, are formed.

The data line 217, which is made of the second conductive film and defines a pixel region by intersecting with the gate line 216, is formed through the photolithography process. An ohmic-contact layer 225n, which is made of the n+ amorphous silicon thin film and patterned into the same shape as the source and drain electrodes 222 and 223, is formed on the active pattern 224. The active pattern 224, the source and drain electrodes 222 and 223 and the data line 217 according to the second exemplary embodiment of the present invention may simultaneously be formed through a one-time masking process using a half-tone mask or diffraction mask.

Figure 16D:
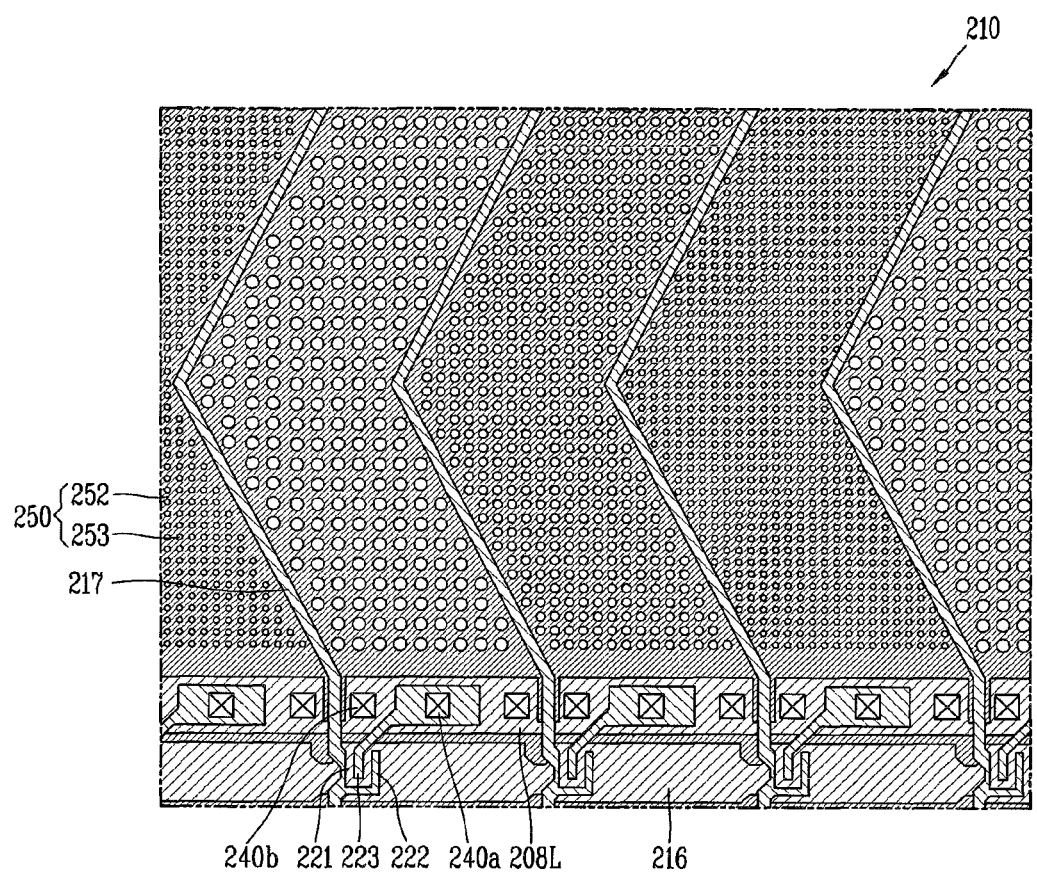
Figure 17D:
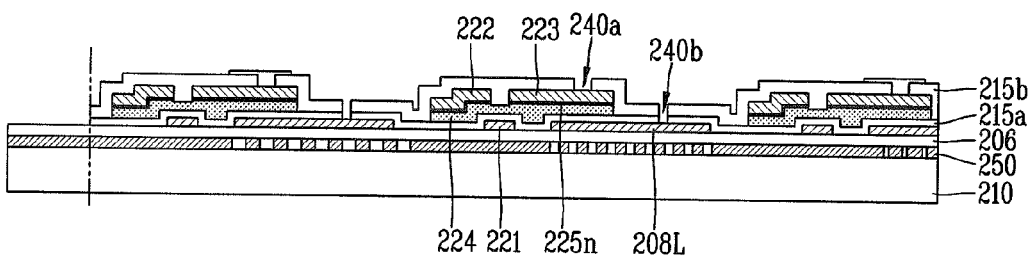

As shown in FIGS. 16D and 17D, the second insulating layer 215b is selectively removed through the photolithography process, thereby forming a first contact hole 240a on the array substrate 210 for partially exposing the drain electrode 223, after forming a second insulating layer 215b on the entire surface of the array substrate 210, on which the active pattern 224, the source and drain electrodes 222 and 223 and the data line 217 are formed. Also, the first insulating layer 215a and the second insulating layer 215b are selectively removed to form a second contact hole 240b on the array substrate 210 for partially exposing the common line 208L.

Figure 16E:
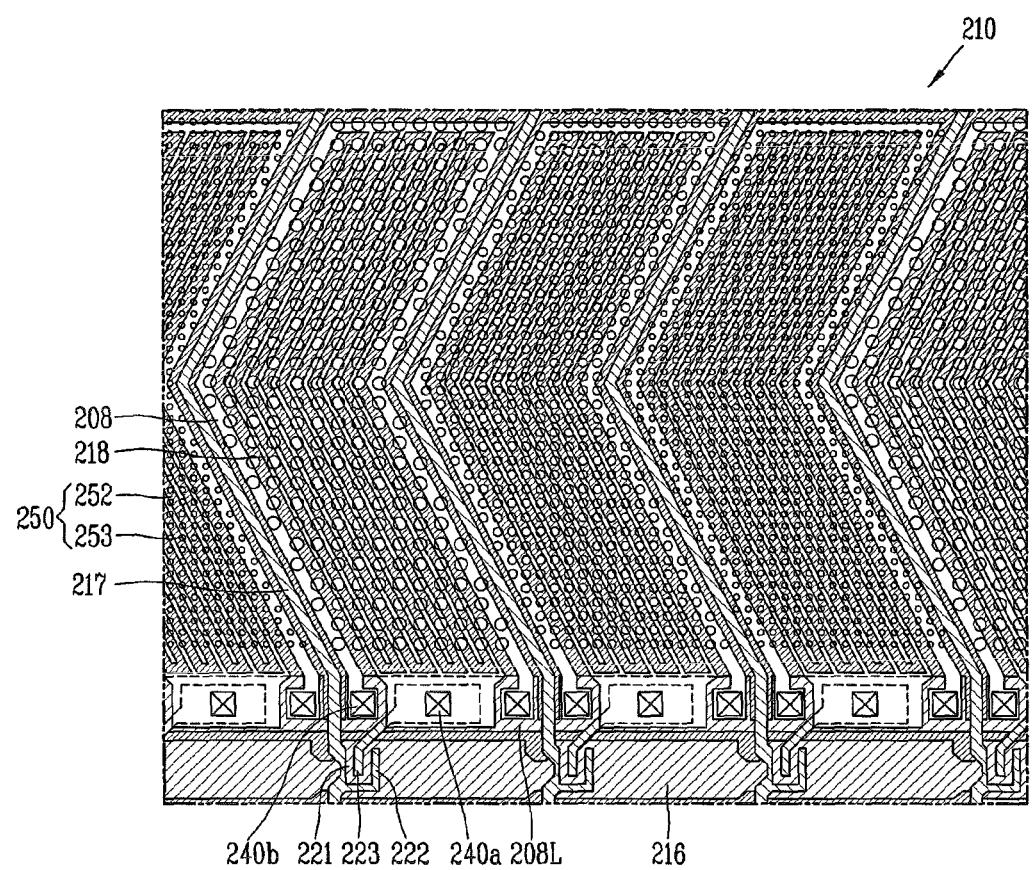
Figure 17E:
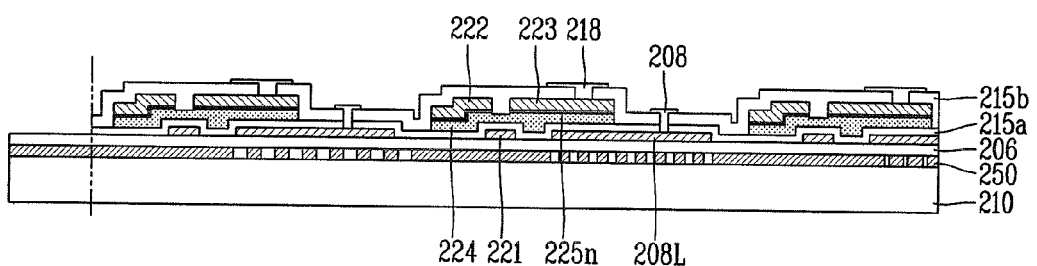

As shown in FIGS. 16E and 17E, after forming a third conductive film on the entire surface of the array substrate 210, on which the second insulating layer 215b is formed, the third conductive film is then selectively removed through the photolithography process, thereby forming the pixel electrode 218, which is electrically connected to the drain electrode 223 via the first contact hole 240a, and the common electrode 208, which is electrically connected to the common line 208L via the second contact hole 240b.

The array substrate according to each of the first and second exemplary embodiments of the present invention is attached onto a color filter substrate facing each other using a sealant formed on an edge of the image display region.

Figure 18:
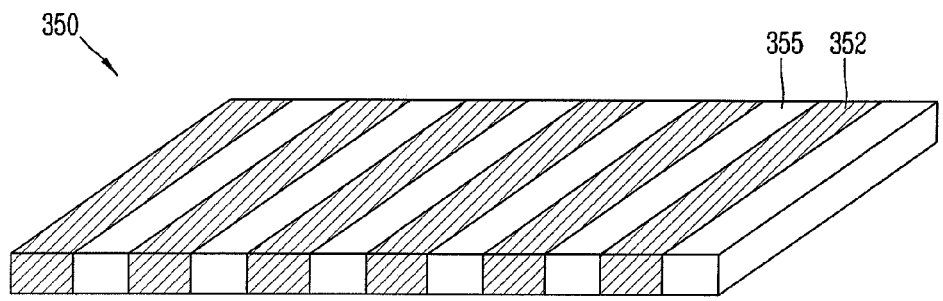
FIG. 18 is a prospective view showing a structure of a color filter fabricated in accordance with a third exemplary embodiment of the present invention.

FIG. 18 is a prospective view showing a structure of a color filter fabricated in accordance with a third exemplary embodiment of the present invention. As shown in FIG. 18, the transmissive pattern 350 can have a periodic pattern in only one direction. The transmissive pattern 350 can include stripes of one material 352 that are interposed between another material 355.

The first to third exemplary embodiments of the present invention have illustrated an amorphous silicon thin film transistor using an amorphous silicon thin film as an active pattern. However, the present invention is not limited to this configuration. For example, the present invention may also be applicable to a polycrystalline thin film transistor using a polycrystalline silicon thin film as the active pattern.

The present invention is not limited to LCD devices but may also be used in other display devices fabricated using thin film transistors, such as an organic light emitting diode (OLED) display device in which OLEDs are connected to switching transistors.

It will be apparent to those skilled in the art that various modifications and variations can be made in the liquid crystal display device and method of fabricating the same of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, the method comprising:
    preparing a first substrate and a second substrate comprising red, green, and blue color regions;
    forming a thin film transistor including a gate electrode, a semiconductor layer, a source electrode, and a drain electrode on the first substrate;
    forming a pixel electrode connected to the drain electrode on the first substrate;
    forming a color filter comprising red, green, and blue color transmissive patterns with a plurality of periodic holes on the second substrate, the transmissive pattern with a plurality of periodic holes comprising a metal layer, a thick red color transmissive pattern being formed in the red color region, the green color transmissive pattern being thinner than the red color transmissive pattern, and the blue color transmissive pattern, being a thinnest color transmissive pattern, being formed in the blue color region;
    forming an insulating layer on the color filter, including an inside of the holes, the insulating layer being formed of a same dielectric material as that of the second substrate;
    forming a sealant between a surface of the first substrate and the metal layer of the color filter;
    forming a liquid crystal layer between the first and second substrates; and
    bonding the first and second substrates to each other.

2. The method of claim 1, wherein the color filter is formed of at least one of aluminum, molybdenum, copper, gold, silver, and chromium.

3. The method of claim 1, wherein a cross-sectional view of the holes of the transmissive pattern includes at least one of circle, oval, triangle, square, and rectangle.

4. The method of claim 3, wherein a cross-sectional view of the holes of the transmissive pattern includes a plurality of circles with a diameter in the range of 100 to 300 nm and a period in the range of 300 to 700 nm.

5. The method of claim 1, wherein the thin film transistor is formed on an inner surface of the first substrate and the sealant is formed between the inner surface of the first substrate and the metal layer of the color filter.

6. A method of fabricating a liquid crystal display device, the method comprising:
    preparing a first substrate, comprising red, green, and blue color regions, and a second substrate;
    forming a color filter comprising red, green, and blue color transmissive patterns with a plurality of periodic holes on the first substrate, the transmissive pattern with a plurality of periodic holes comprising a metal layer, a thick red color transmissive pattern being formed in the red color region, the green color transmissive pattern being thinner than the red color transmissive pattern, and the blue color transmissive pattern, being a thinnest color transmissive pattern, being formed in the blue color region;
    forming an insulating layer on the color filter, including an inside of the holes, the insulating layer being formed of a same dielectric material as that of the first substrate;
    forming a thin film transistor including a gate electrode, a semiconductor layer, a source electrode, and a drain electrode on the insulating layer;
    forming a pixel electrode connected to the drain electrode on the first substrate;
    forming a sealant between a surface of the insulating layer and the second substrate;
    forming a liquid crystal layer between the first and second substrates; and
    bonding the first and second substrates to each other.

7. The method of claim 6, further comprising a common electrode formed on the second substrate.

8. The method of claim 6, further comprising a common electrode formed parallel to the pixel electrode wherein the pixel electrode and the common electrode have at least one bent portion.

9. The method of claim 6, wherein the color filter is formed of at least one of aluminum, molybdenum, copper, gold, silver, and chromium.

10. The method of claim 6, wherein a cross-sectional view of the holes of the transmissive pattern includes at least one of circle, oval, triangle, square, and rectangle.

11. The method of claim 10, wherein a cross-sectional view of the holes of the transmissive pattern includes a plurality of circles with a diameter in the range of 100 to 300 nm and a period in the range of 300 to 700 nm.

12. A liquid crystal display device, comprising:
    a first substrate;
    a thin film transistor including a gate electrode, a semiconductor layer, a source electrode, and a drain electrode formed on the first substrate;
    a pixel electrode connected to the drain electrode formed on the first substrate;
    a second substrate, comprising red, green, and blue color regions, and bonded to the first substrate;
    a color filter comprising red, green, and blue color transmissive patterns with a plurality of periodic holes on the second substrate, the transmissive pattern with a plurality of periodic holes comprising a metal layer, a thick red color transmissive pattern being formed in the red color region, the green color transmissive pattern being thinner than the red color transmissive pattern, and the blue color transmissive pattern, being a thinnest color transmissive pattern, being formed in the blue color region;
    an insulating layer on the color filter, including an inside of the holes, the insulating layer being formed of a same dielectric material as that of the second substrate; and
    a sealant formed between a surface of the first substrate and the metal layer of the color filter.

13. The liquid crystal display device of claim 12, wherein the color filter is formed of at least one of aluminum, molybdenum, copper, gold, silver, and chromium.

14. The liquid crystal display device of claim 12, wherein a cross-sectional view of the holes of the transmissive pattern includes at least one of circle, oval, triangle, square, and rectangle.

15. The liquid crystal display device of claim 14, wherein a cross-sectional view of the holes of the transmissive pattern includes a plurality of circles with a diameter in the range of 100 to 300 nm and a period in the range of 300 to 700 nm.

16. The liquid crystal display device of claim 12, wherein the thin film transistor is formed on an inner surface of the first substrate and the sealant is formed between the inner surface of the first substrate and the metal layer of the color filter.

17. A liquid crystal display device, comprising:
a first substrate, comprising red, green, and blue color regions;
a color filter comprising red, green, and blue color transmissive patterns with a plurality of periodic holes on the first substrate, the transmissive pattern with a plurality of periodic holes comprising a metal layer, a thick red color transmissive pattern being formed in the red color region, the green color transmissive pattern being thinner than the red color transmissive pattern, and the blue color transmissive pattern, being a thinnest color transmissive pattern, being formed in the blue color region;
an insulating layer on the color filter, including an inside of the holes, the insulating layer being formed of a same dielectric material as that of the first substrate;
a thin film transistor including a gate electrode, a semiconductor layer, a source electrode, and a drain electrode formed on the insulating layer;
a pixel electrode connected to the drain electrode formed on the first substrate;
a second substrate bonded to the first substrate; and
a sealant formed between a surface of the insulating layer and the second substrate.

18. The liquid crystal display device of claim 17, further comprising a common electrode formed on the second substrate.

19. The liquid crystal display device of claim 17, further comprising a common electrode formed parallel to the pixel electrode wherein the pixel electrode and the common electrode have at least one bent portion.

20. The liquid crystal display device of claim 17, wherein the color filter is formed of at least one of aluminum, molybdenum, copper, gold, silver, and chromium.

21. The liquid crystal display device of claim 17, wherein a cross-sectional view of the holes of the transmissive pattern includes at least one of circle, oval, triangle, square, and rectangle.

22. The liquid crystal display device of claim 21, wherein a cross-sectional view of the holes of the transmissive pattern includes a plurality of circles with a diameter in the range of 100 to 300 nm and a period in the range of 300 to 700 nm.

* * * * *